United States Patent
Komiya et al.

(10) Patent No.: US 6,462,855 B1
(45) Date of Patent: Oct. 8, 2002

(54) LIGHT BEAM SCANNING APPARATUS

(75) Inventors: Kenichi Komiya; Koji Tanimoto, both of Kawasaki; Toshimitsu Ichiyanagi, Zushi; Jun Sakakibara, Tokyo; Koji Kawai, Fujisawa, all of (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 8 days.

(21) Appl. No.: 09/667,317

(22) Filed: Sep. 22, 2000

(30) Foreign Application Priority Data

Sep. 24, 1999 (JP) ............................................. 11-270894

(51) Int. Cl.[7] .............................................. G02B 26/08
(52) U.S. Cl. .................... 359/212; 359/216; 250/208.1; 250/235
(58) Field of Search ................................. 359/212–226; 347/243, 259–261, 234, 235, 248, 250; 250/234–236, 208.1; 358/475, 481

(56) References Cited

U.S. PATENT DOCUMENTS

| | | | |
|---|---|---|---|
| 4,974,100 A | 11/1990 | Odaka et al. ................. | 360/90 |
| 5,539,719 A | 7/1996 | Motoi ......................... | 369/112 |
| 5,892,533 A | 4/1999 | Tanimoto et al. ........... | 347/257 |
| 5,929,891 A | 7/1999 | Komiya et al. ............. | 347/235 |
| 5,995,246 A | 11/1999 | Komiya et al. ............. | 358/481 |

FOREIGN PATENT DOCUMENTS

| | | |
|---|---|---|
| JP | 1-43294 | 9/1989 |
| JP | 3-57452 | 9/1991 |
| JP | 3-57453 | 9/1991 |
| JP | 5-32824 | 5/1993 |
| JP | 7-72399 | 3/1995 |
| JP | 7-228000 | 8/1995 |
| JP | 9-210849 | 8/1997 |
| JP | 9-258125 | 10/1997 |
| JP | 9-314901 | 12/1997 |
| JP | 10-76704 | 3/1998 |
| JP | 10-142535 | 5/1998 |

*Primary Examiner*—James Phan
(74) *Attorney, Agent, or Firm*—Foley & Lardner

(57) ABSTRACT

A pair of sensor patterns detect a passage position in a sub-scan direction of a light beam scanned over a surface of a photosensitive drum. The sensor patterns have, for example, trapezoidal shapes and are disposed symmetrical at a position equivalent to a position of the surface to be scanned. The sensor patterns are juxtaposed in a scan direction of the light beam at a predetermined interval therebetween. An output integration value from one of the paired photodetector elements successively increases while an output integration value from the other photodetector element successively decreases in relation to a variation of a passage position of the light beam in the sub-scan direction. On the basis of a difference between the output integration values of the paired sensor patterns, the passage position of the light beam in the sub-scan direction is detected.

19 Claims, 23 Drawing Sheets

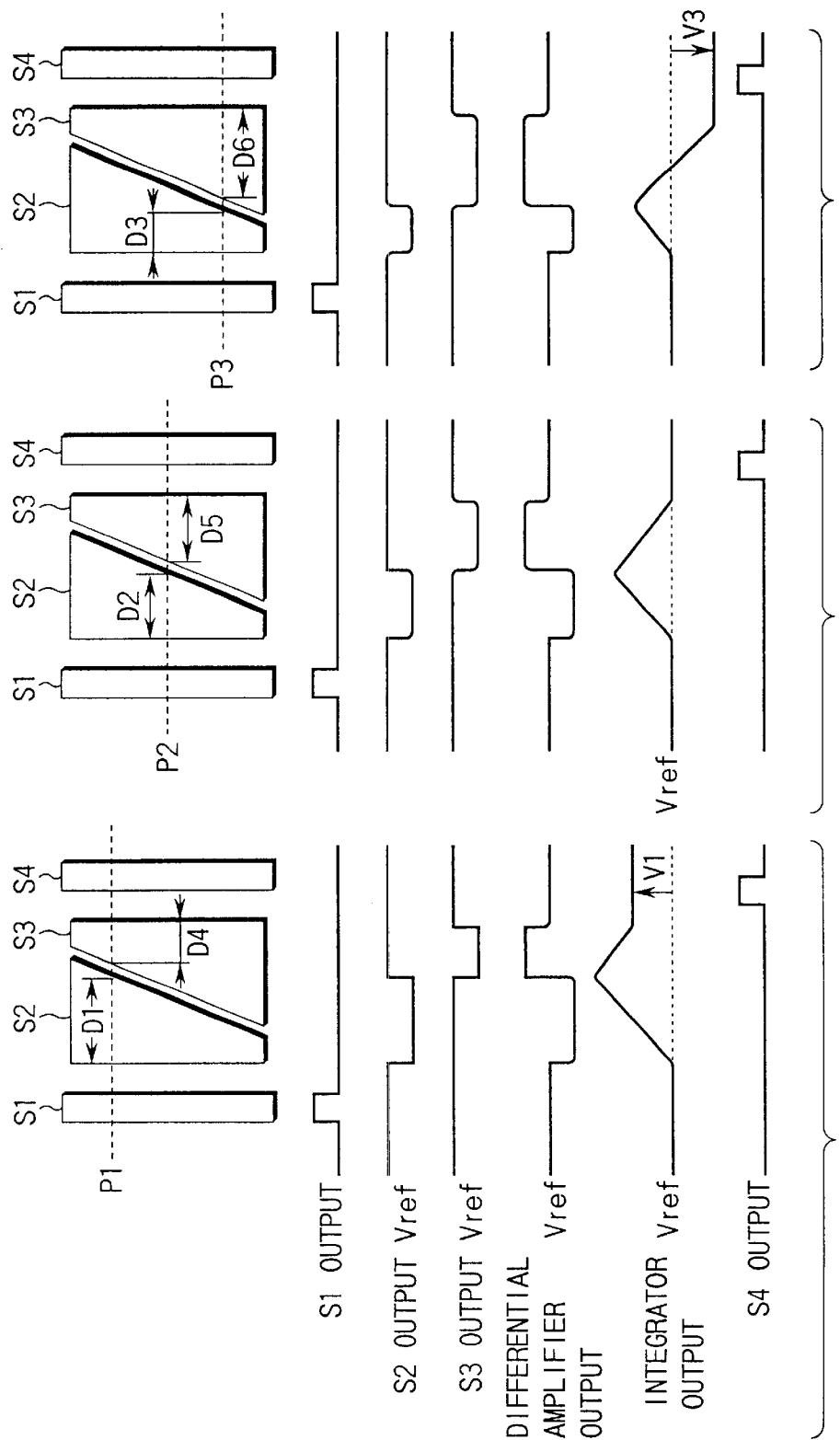

LIGHT BEAM SCANNING APPARATUS

CROSS-REFERENCE TO RELATED APPLICATIONS

This application is based upon and claims the benefit of priority from the prior Japanese Patent Application No. 11-270894, filed Sep. 24, 1999, the entire contents of which are incorporated herein by reference.

BACKGROUND OF THE INVENTION

The present invention relates, for example, to a light beam scanning apparatus for scanning a plurality of laser beams in an image forming apparatus, such as a digital copying machine or a laser printer, which scans and exposes a single photosensitive drum with a plurality of laser beams at the same time, thereby forming a single electrostatic latent image on the photosensitive drum.

In recent years, various types of digital copying machines have been developed, which carry out image formation, for example, by scanning exposure with a laser light beam (hereinafter referred to merely as "light beam") and an electronic photographing process.

Recently, in order to increase image formation speed, a digital copying machine adopting a multi-beam system has been developed. Specifically, in this system, a plurality of light beams are produced and a simultaneous scan is performed in units of a plurality of lines with these light beams.

The multi-beam type digital copying machine comprises a plurality of semiconductor lasers for producing light beams, a polyhedral rotary mirror, such as a polygon mirror, for reflecting the light beams output from the plural lasers toward a photosensitive drum to scan the photosensitive drum with the light beams, and an optical system unit functioning as a light beam scanning apparatus composed mainly of a collimator lens and an f-θ lens.

In the conventional multi-beam type digital copying machine, in order to produce a high-quality image, the optical system unit controls an exposure position in a scan direction of a light beam (main-scan-direction beam position control) and a beam passage position (sub-scan-direction beam position control).

Examples of the control technique are disclosed in Jpn. Pat. Appln. KOKOKU Publication No. 1-43294, Jpn. Pat. Appln. KOKOKU Publication No. 3-57452, Jpn. Pat. Appln. KOKOKU Publication No. 3-57453, Jpn. UM Appln. KOKOKU Publication No. 5-32824, Jpn. Pat. Appln. KOKAI Publication No. 7-72399, Jpn. Pat. Appln. KOKAI Publication No. 7-228000, Jpn. Pat. Appln. KOKAI Publication No. 9-210849, Jpn. Pat. Appln. KOKAI Publication No. 9-258125, Jpn. Pat. Appln. KOKAI Publication No. 9-314901, and Jpn. Pat. Appln. KOKAI Publication No. 10-76704. The techniques disclosed in these documents have problems, as will be described below.

In the main-scan-direction beam position control, it is important that a sensor, or sensor means, be disposed with a predetermined relation (angle) to the beam scan direction. If the sensor is displaced from a predetermined position, it cannot exactly sense the main-scan-direction beam position (relative position). As a result, for example, a vertical straight line cannot be formed.

However, Jpn. Pat. Appln. KOKAI Publication No. 9-314901 alone discloses the technique wherein the sensor itself has the function of sensing the relation between the sensor and the light beam scan direction. Even in this case, there are problems in that the range of sensing of inclination is very narrow and the sensing and adjustment are not easy.

As regards the sub-scan-direction beam position control, Jpn. Pat. Appln. KOKAI Publication No. 7-72399, Jpn. Pat. Appln. KOKAI Publication No. 7-228000 and Jpn. Pat. Appln. KOKAI Publication No. 9-210849 disclose examples wherein the beam passage position in the sub-scan direction is sensed on the basis of the length of time over which the light beam passes by the optical sensor.

However, where a variance occurs in f-θ characteristics of an f-θ lens mounted on the optical system unit or a variance occurs in the number of rotations of the polygon mirror, the scan speed of the light beam over the sensor will vary. Consequently, a sensing error may occur in these sensing methods based on the light beam passage time.

Jpn. Pat. Appln. KOKAI Publication No. 9-258125, Jpn. Pat. Appln. KOKAI Publication No. 9-314901 and Jpn. Pat. Appln. KOKAI Publication No. 10-76704 disclose examples wherein the light beam passage position is made to fall between specific sensor patterns formed on the sensor, whereby the light beam passage position is controlled to fall on a predetermined position. In the structures described in these documents, however, it is necessary to control the light beams individually so as to fall on predetermined positions. Compared to the case where a certain light beam is used as a reference beam and the passage positions of the other light beams are controlled on the basis of the reference beam, the number of actuators for controlling the beam passage positions increases and the cost rises.

Moreover, the sensor patterns for making the light beams fall on predetermined positions have high sensing precision, but the range (=sensing range) of the variation in sensor output relative to the variation in beam passage position is narrow. Consequently, control becomes complex, and much time is required for control.

BRIEF SUMMARY OF THE INVENTION

An object of the present invention is to provide a light beam scanning apparatus capable of exactly detecting a passage position of a light beam in a wide range in a sub-scan direction using a less number of sensor patterns, and performing a high-precision beam passage position control.

Another object of the invention is to provide a multi-beam scanning apparatus capable of exactly controlling relative passage positions of a plurality of light beams in a wide range in a sub-scan direction using a less number of sensor patterns.

Still another object of the invention is to provide a multi-beam scanning apparatus capable of controlling passage positions of light beams to come to predetermined positions using a less number of actuators than the number of simultaneously scanned light beams.

Still another object of the invention is to provide a light beam scanning apparatus capable of exactly performing a desired beam passage position control, without the effect of an eclipse of a light beam.

Still another object of the invention is to provide a light beam scanning apparatus with a simplified structure, which is attained by sharing of sensor patterns.

Still another object of the invention is to provide a light beam scanning apparatus capable of determining whether a beam passage position control is feasible or not when a passage position of a light beam has varied due to a variation with the passing of time, and issuing an alarm where the beam passage position control is not feasible.

Still another object of the invention is to provide a light beam scanning apparatus capable of matching with an increase in the light beam scanning speed.

A pair of sensor patterns for detecting the beam passage position according to the present invention are juxtaposed in the main scan direction and are constructed such that an output from one of the paired sensor patterns successively increases while an output from the other sensor pattern successively decreases in relation to a variation of the passage position of the light beam in the sub-scan direction. The paired sensor patterns have a sufficient length in the sub-scan direction and can exactly detect the passage position of the light beam in a wide range in the sub-scan direction. Therefore, with the simple structure and operation, a high-precision beam passage position control can be performed.

The paired sensor patterns according to this invention are applicable to a light beam scanning apparatus using a multi-beam optical system which simultaneously scan a plurality of light beams. Therefore, relative passage positions of plural light beams can exactly be controlled in a wide range in the sub-scan direction.

A sub-scan-directional position of a first beam of the plural light beams may be fixed. Therefore, passage positions of light beams can be controlled to come to predetermined positions using a less number of actuators than the number of simultaneously scanned light beams.

Light amounts of a plurality of light beams are detected at a position equivalent to a position of the surface to be scanned. Using a correction coefficient corresponding to a ratio of the detected light amounts, outputs from the sensor patterns for beam passage position detection are corrected. Therefore, a desired beam passage position control can exactly be performed without the effect of an eclipse of a light beam.

The outputs from the paired sensor patterns according to the present invention are added to detect the light amount of the light beam. Specifically, the sensor patterns for the beam passage position detection are also used for the light amount detection. Therefore, the light beam sensor and the process circuit for the output thereof can be simplified, and the degree of freedom of arrangement of other sensor patterns is increased. A nearly optimal arrangement of sensor patterns can be made.

Sensor patterns are provided to monitor the passage position of the fixed light beam. Where the passage position of the fixed light beam has varied due to a variation with the passing of time, it is determined whether the beam passage position control is feasible or not. If it is determined that the beam passage position control is not feasible, an alarm is issued to indicate this undesirable state.

In the present invention, unlike the prior art, the sensor pattern output integration time period in the beam passage position detection mode may be different from that in the offset detection mode. On the basis of the ratio of the integration time periods, the detected offset value is corrected. As a result, the degree of freedom of arrangement of sensor patterns is increased.

With the above features, in the present invention, in particular, in the field of image forming apparatuses such as digital copying machines, the quality of output images can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A to 6C show outputs of sensor patterns, outputs of differential, amplifiers and outputs of integrators, which depend on light beam passage positions;

DETAILED DESCRIPTION OF THE INVENTION

Embodiments of the present invention will now be described with reference to the accompanying drawings.

To begin with, a description will be given of common portions of the respective embodiments.

Figure 1:
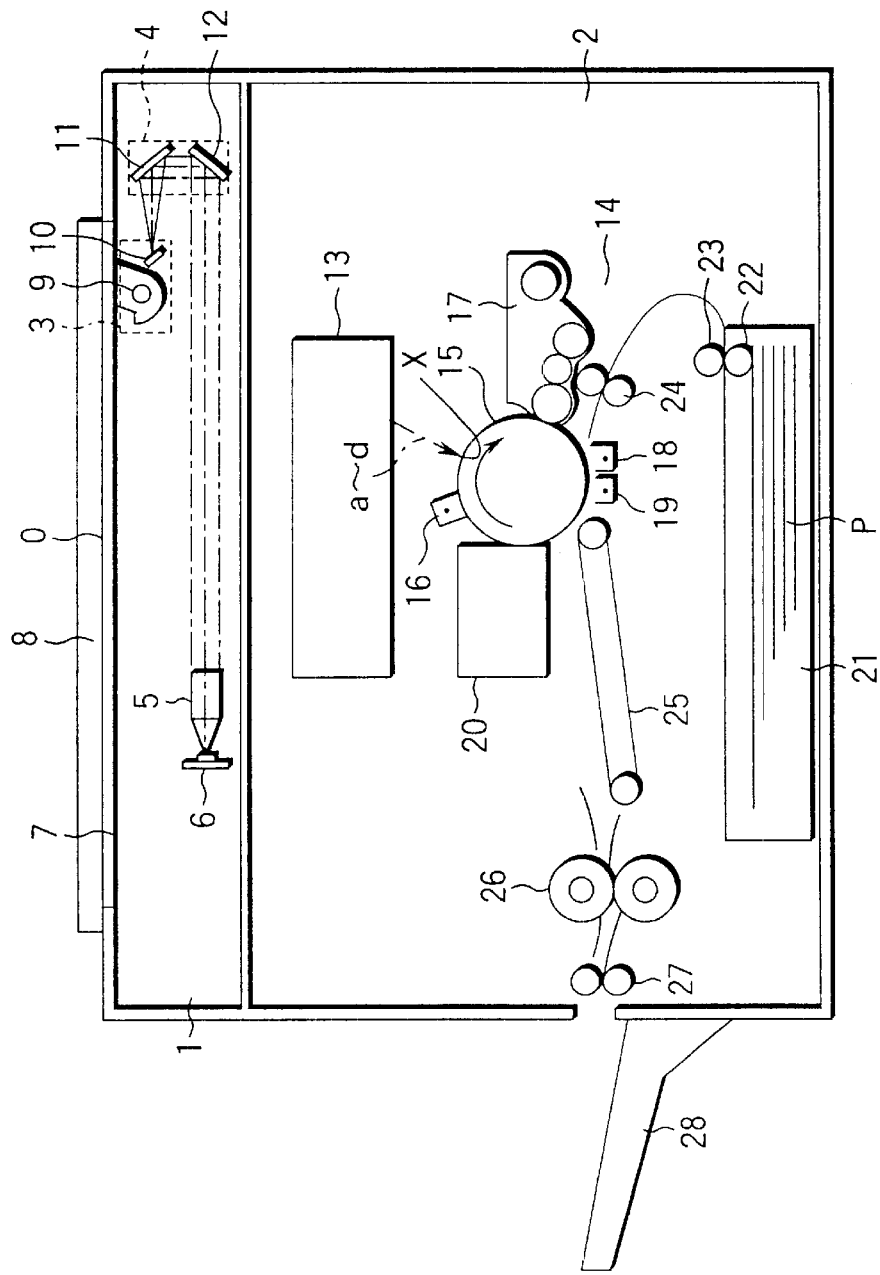
FIG. 1 schematically shows a structure of a digital copying machine according to an embodiment of the present invention.

FIG. 1 schematically shows a structure of a digital copying machine used as an image forming apparatus to which the light beam scanning apparatus according to the present invention is applied. The digital copying machine comprises a scanner section 1 serving as image reading means and a printer section 2 serving as image forming means. The scanner section 1 includes a first carriage 3 and a second carriage 4, both movable in a direction of an arrow, a focusing lens 5, and a photoelectric conversion element 6.

In FIG. 1, an original O is placed, with its face downward, on an original table 7 formed of transparent glass. The original O is held on the original table 7 by an openable original holding cover 8.

The original O is illuminated by a light source 9. Reflection light from the original O is converged on a light-receiving surface of the photoelectric conversion element 6 via mirrors 10, 11 and 12 and the focusing lens 5. The first carriage 3 having the light source 9 and mirror 10 and the second carriage 4 having the mirrors 11 and 12 are moved at a relative speed of 2:1 so that the optical path length may always be constant. The first carriage 3 and second carriage 4 are moved from the right to the left by a carriage drive motor (not shown) in synchronism with a read timing signal.

An image on the original O placed on the original table 7 is successively read line by line by the scanner section 1. A read output is converted to an 8-bit digital image signal representing image density in an image process section (not shown).

The printer section 2 comprises an image forming section 14 wherein an optical system unit 13 is combined with an electrophotographic system capable of forming an image on a paper sheet P, or an image formation medium. Specifically, an image signal read from the original O by the scanner section 1 is processed by the image process section (not shown) and then converted to a laser light beam (hereinafter referred to as merely "light beam") to be emitted from a semiconductor laser. The image forming apparatus according to the present invention adopts a multi-beam optical system using a plurality (e.g. four) of semiconductor lasers.

The semiconductor lasers provided in the optical system unit 13 are driven according to laser modulation signals output from the image process section (not shown), thus emitting a plurality of light beams. The light beams are reflected by a polygon mirror and emitted out of the unit as scan beams. The details of the optical system unit 13 will be described later.

The light beams emitted from the optical system unit 13 are focused, as spot light having a required resolution, at an exposure location X on a photosensitive drum 15 serving as an image carrying body, and the light beams scan the surface of the photosensitive drum 15 in a main scan direction (i.e. in a direction of a rotational axis of the photosensitive drum). The photosensitive drum 15 is rotated and an electrostatic latent image corresponding to the image signal is formed on the photosensitive drum 15.

Around the photosensitive drum 15, there are provided a charger 16 for charging the surface of the drum 15, a developer unit 17, a transfer charger 18, a separator charger 19 and a cleaner 20. The photosensitive drum 15 is rotated by a drive motor (not shown) at a predetermined circumferential speed and is charged by the charger 16 disposed to face the surface of the drum 15. The light beams arranged in a sub-scan direction (i.e. a direction of movement of the photosensitive drum surface) are spot-focused at the exposure location X on the charged photosensitive drum 15.

The electrostatic latent image formed on the photosensitive drum 15 is developed into a toner image with a toner (developer agent) supplied from the developer unit 17. The toner image formed on the photosensitive drum 15 is transferred by the transfer charger 18 onto a paper sheet P fed from a paper feed system with a predetermined timing.

The paper feed system feeds paper sheets P, which are contained in a paper feed cassette 21 provided at the bottom of the apparatus, one by one separately by means of a feed roller 22 and a separation roller 23. The paper sheet P coming out of the paper feed cassette 21 is fed to register rollers 24 and then to a transfer position at a predetermined timing. On the downstream side of the transfer charger 18, there are provided a sheet convey mechanism 25, a fixing unit 26, and output rollers 27 for outputting paper sheets P with images. Accordingly, the paper sheet P on which the toner image has been transferred is conveyed to the fixing unit 26 and the toner image is fixed by the fixing unit 26. The resultant paper sheet P is delivered onto a sheet output tray 28 via the output rollers 27.

The toner remaining on the surface of the photosensitive drum 15, from which the toner image has been transferred onto the paper sheet P, is removed by the cleaner 20, and the photosensitive drum 15 is restored to its original state and made ready to be used again for image formation.

By repeating the above process, the image formation operation is successively performed.

As has been described above, the original O placed on the original table 7 is read by the scanner section 1, and the read information is subjected to a series of processes in the printer section 2 and then recorded on the paper sheet P as the toner image.

The optical unit 13 will now be described.

Figure 2:
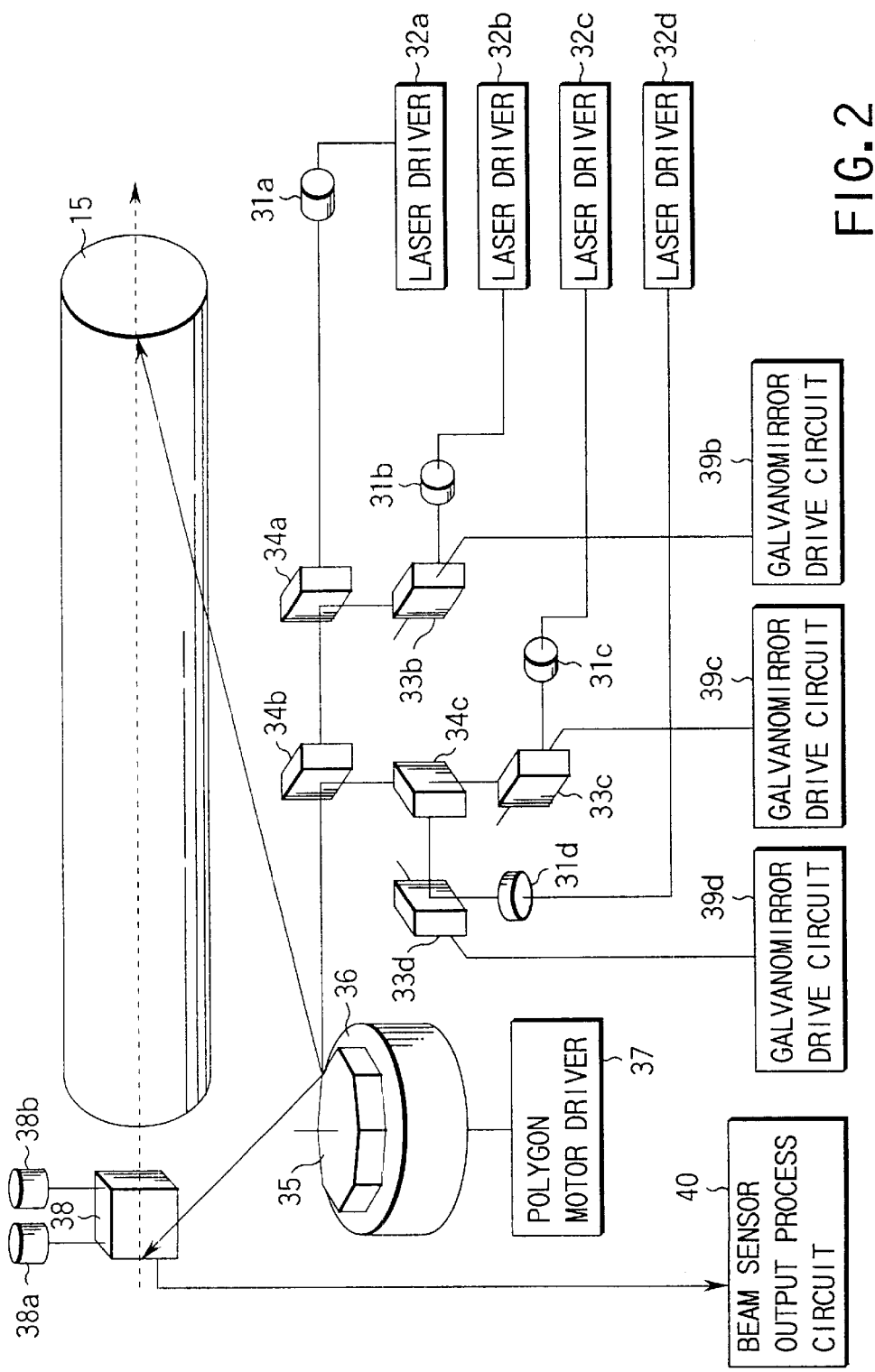
FIG. 2 shows a positional relationship between the structure of an optical system unit and a photosensitive drum.

FIG. 2 shows a positional relationship between the structure of the optical system unit 13 and photosensitive drum 15. The optical system unit 13 includes, for example, four semiconductor lasers 31a, 31b, 31c and 31d as light beam generating means. The semiconductor lasers 31a to 31d simultaneously perform image formation line by line. Thus, without the need to excessively increase the number of rotations of the polygon mirror, high-speed image formation can be effected.

Specifically, the laser 31a is driven by a laser driver 32a. A light beam emitted from the laser 31a passes through a collimator lens (not shown) and half-mirrors 34a and 34b and falls on a polygon mirror 35 serving as a polyhedral rotary mirror.

The polygon mirror 35 is rotated at a constant speed by a polygon motor 36 driven by a polygon motor driver 37. Thus, reflection light from the polygon mirror 35 scans the photosensitive drum in a predetermined direction at an angular speed determined by the number of rotations of the polygon motor 36. A light beam scanned by the polygon mirror 35 passes through an f-θ lens (not shown) and scans, at a constant speed with f-θ characteristics, a light-receiving surface of the light beam sensor 38 functioning as light beam position sensor means, light beam passage timing sensor means and light beam power sensor means, and also scans the surface of the photosensitive drum 15.

The laser 31b is driven by a laser driver 32b. A light beam emitted from the laser 31b passes through a collimator lens (not shown), and it is reflected by a galvanomirror 33b and then by the half mirror 34a. A beam reflected by the half mirror 34a passes through the half mirror 34b and strikes on the polygon mirror 35. The optical path after the polygon mirror 35 is common to the case of the beam from the laser 31a.

That is, the beam passes through the f-θ lens (not shown) and scans at a constant speed the light-receiving surface of the light beam sensor 38 and the surface of the photosensitive drum 15.

The laser 31c is driven by a laser driver 32c. A light beam emitted from the laser 31c passes through a collimator lens (not shown), and it is reflected by a galvanomirror 33c and passes through a half mirror 34c. A beam emanating from the half mirror 34c is reflected by the half mirror 34b and strikes on the polygon mirror 35. The optical path after the polygon mirror 35 is common to the cases of the beams from the lasers 31a and 31b. That is, the beam passes through the f-θ lens (not shown) and scans at a constant speed the light-receiving surface of the light beam sensor 38 and the surface of the photosensitive drum 15.

The laser 31d is driven by a laser driver 32d. A light beam emitted from the laser 31d passes through a collimator lens (not shown), and it is reflected by a galvanomirror 33d and then by the half mirror 34c. A beam reflected by the half mirror 34c is further reflected by the half mirror 34b and falls on the polygon mirror 35. The optical path after the polygon mirror 35 is common to the cases of the beams from the lasers 31a, 31b and 31c. That is, the beam passes through the f-θ lens (not shown) and scans at a constant speed the light-receiving surface of the light beam sensor 38 and the surface of the photosensitive drum 15.

Each of the laser drivers 32a to 32d includes an auto-power control (APC) circuit. Thus, the laser drivers 32a to 32d can always drive the lasers 31a to 31d at predetermined light emission power levels set by a main control unit, or a central processing unit (CPU), 51 (to be described later).

The light beams emitted from the different lasers 31a, 31b, 31c and 31d are combined by the half mirrors 34a, 34b and 34c, and the four light beams travel to the polygon mirror 35.

Accordingly, the four light beams can simultaneously scan the photosensitive drum 15, and images can be recorded at a speed four times as high as in the case of the single-beam system, if the rotation speed of the polygon mirror 35 is unchanged.

The galvanomirrors 33b, 33c and 33d are driven by galvanomirror drive circuits 39b, 39c and 39d to control the sub-scan-directional positions of the light beams emitted from the lasers 31b, 31c and 31d relative to the light beam emitted from the laser 31a.

The light beam sensor 38 is provided with light beam position adjusting motors 38a and 38b in order to adjust its position and inclination relative to the beam scan direction.

The light beam sensor 38 senses the passage positions, passage timings and powers (light amounts) of the aforementioned four light beams. The light beam sensor 38 is disposed near an end portion of the photosensitive drum 15, and the light-receiving surface of the light beam sensor 38 is equivalent to the surface of the photosensitive drum 15. On the basis of sense signals from the light beam sensor 38, the control (image formation position control in sub-scan direction) of the galvanomirrors 33b, 33c and 33d is carried out in connection with the associated light beams, the emission powers of the lasers 31a, 31b, 31c and 31d are controlled, and the control (image formation position control in main direction) of the emission timing is carried out (the details will be described later).

In order to produce signals for performing these controls, a beam sensor output process circuit 40 is connected to the light beam sensor 38.

The control system will now be described.

Figure 3:
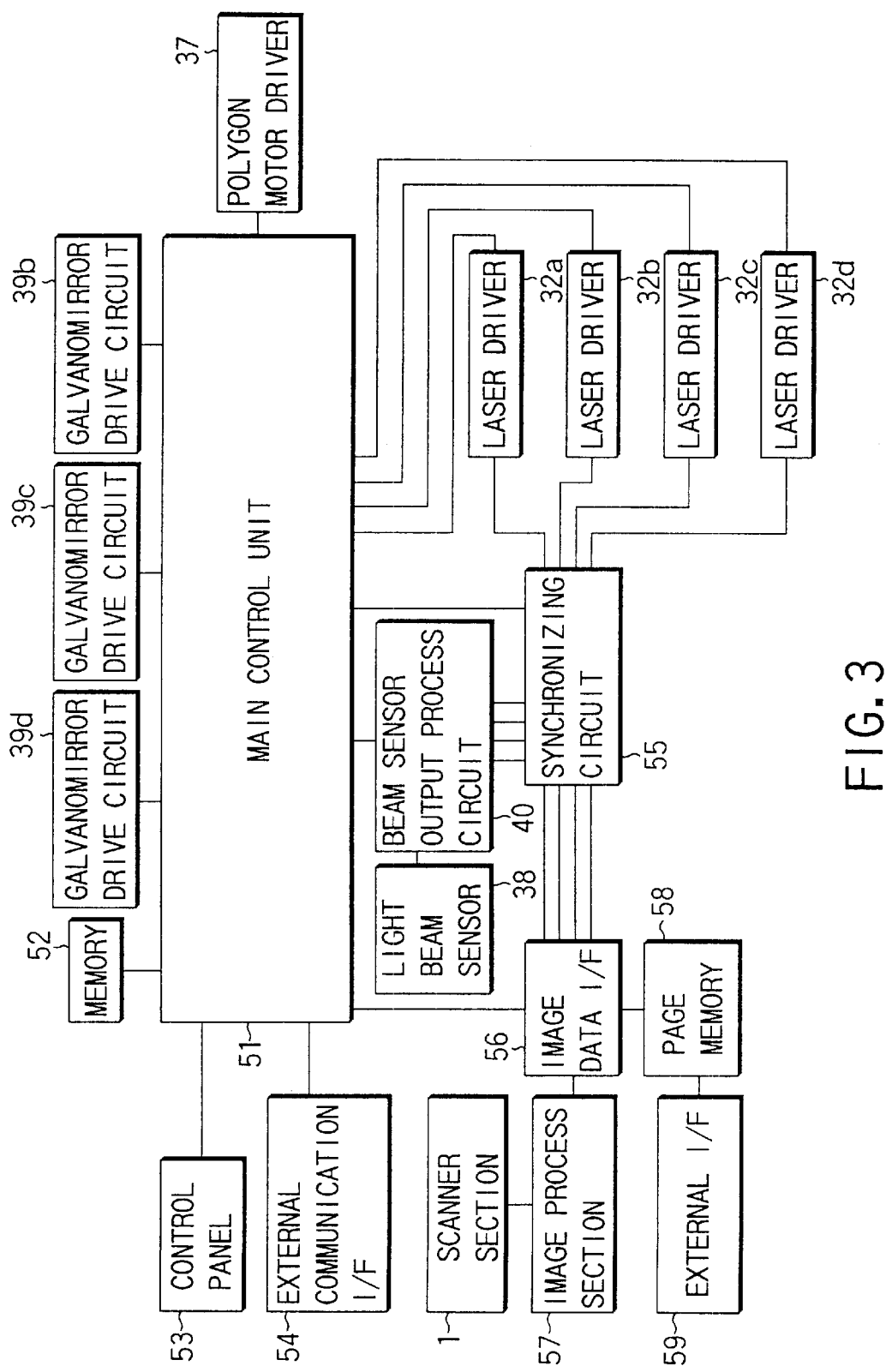
FIG. 3 is a block diagram showing a control system associated Mainly with control of the optical system.

FIG. 3 shows the control system for mainly controlling the multi-beam control system. Specifically, numeral 51 denotes a main control unit 51 composed of, e.g. a CPU and performing an overall control. The main control unit 51 is connected to a memory 52, a control panel 53, an external communication interface (I/F) 54, the laser drivers 32a, 32b, 32c and 32d, the polygon mirror motor driver 37, the galvanomirror drive circuits 39b, 39c and 39d, the light beam sensor output process circuit 40, a synchronizing circuit 55, and an image data interface (I/F) 56.

The image data I/F 56 is connected to the synchronizing circuit 55. An image process section 57 and a page memory 58 are connected to the image data I/F 56. The scanner section 1 is connected to the image process section 57, and an external interface (I/F) 59 is connected to the page memory 58.

The flow of image data at the time of forming an image will now be described in brief.

At first, in the case of a copying operation, as has been described above, the image on the original O set on the original table 7 is read by the scanner section 1 and the read image is sent to the image process section 57. The image process section 57 subjects the image signal from the scanner section 1 to, e.g. well-known shading correction, various filtering processes, gray level processing, and gamma correction.

Image data from the image process section 57 is sent to the image data I/F 56. The image data I/F 56 functions to distribute the image data to the four laser drivers 32a, 32b, 32c and 32d.

The synchronizing circuit 55 generates a clock synchronized with the timing at which each light beam passes over the light beam sensor 38 and sends, in synchronism with the clock, the image data from the image data I/F 56 to the laser drivers 32a, 32b, 32c and 32d as laser modulation signals.

The synchronizing circuit 55 includes a sample timer and a logic circuit. The sample timer forces the laser 31a, 31b, 31c and 31d to emit light in non-image areas and controls the power of each light beam. The logic circuit activates the lasers 31a, 31b, 31c and 31d when the light beams scan over the light beam sensor 38, and senses the main-scan-directional positions of the respective light beams.

By transferring the image data in synchronism with the scanning of each light beam, image formation synchronized with the main scan direction (at a correct position) can be performed.

The control panel 53 is a man-machine interface for starting the copying operation, setting the number of paper sheets, etc.

The digital copying machine of this embodiment is constructed such that it can perform not only the copying operation but also the image formation based on image data input from the outside via the external I/F 59 connected to the page memory 58. The image data input from the external I/F 59 is once stored in the page memory 58 and then sent to the synchronizing circuit 55 via the image data I/F 56.

Besides, when this digital copying machine is externally controlled via, for example, a network, the external communication I/F 54 serves as the control panel 53.

The galvanomirror driving circuits 39b, 39c and 39d are circuits which drive the galvanomirrors 33b, 33c and 33d in accordance with values specified by the main control unit 51. Thus the main control unit 51 can freely control the angles of the galvanomirrors 33b, 33c and 33d via the galvanomirror drive circuits 39b, 39c and 39d.

The polygon motor driver 37 is a driver for driving the polygon motor 36 for rotating the polygon mirror 35 which scans the aforementioned four light beams. The main control unit 51 enables the polygon motor driver 37 to start/stop the rotation and to change the number of rotations. When the beam passage positions are determined by the light beam sensor 38, the number of rotations of the polygon motor 36 is made less than in the case of forming images.

The laser drivers 32a, 32b, 32c and 32d have the functions of not only emitting laser light in accordance with the image data, but also forcing the laser 31a, 31b, 31c and 31d to emit light in accordance with the forcible light emission signal from the main control unit 51, irrespective of the image data.

The main control unit 51 sets the light emission power of each laser 31a, 31b, 31c, 31d by using each laser driver 32a, 32b, 32c, 32d. The setting of the light emission power is altered in accordance with changes in the process conditions, the sensing of the light beam passing position, etc.

The memory 52 functions to store information necessary for controls. For example, it stores a control amount of each galvanomirror 33b, 33c, 33d, circuit characteristics (offset values of amplifiers) for sensing light beam passing positions, an order of arrival of light beams, etc. Thereby, the optical system unit 13 can be made ready to perform image formation immediately after the power is turned on.

A first embodiment of the present invention will now be described.

In the first embodiment, this invention is applied to a light beam scanning apparatus having a single-beam optical system wherein scanning is performed using a single light beam. The first embodiment intends to show the principles of light beam passage position sensing and control according to the present invention.

Figure 4:
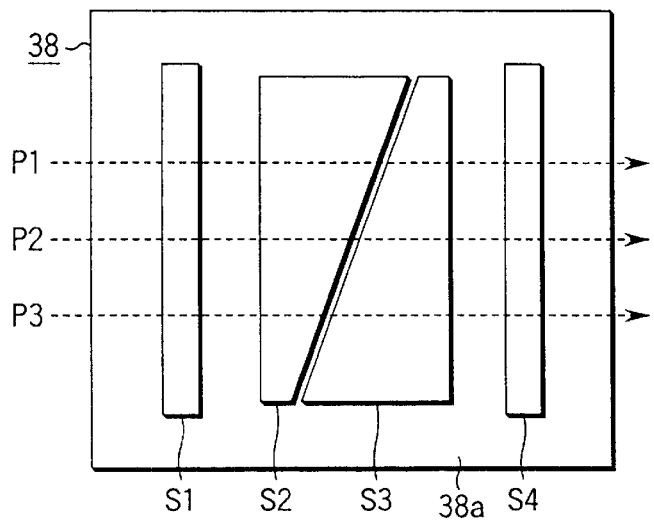
FIG. 4 schematically shows a structure of a light beam sensor according to a first embodiment of the invention.

FIG. 4 shows a relationship between the structure of the light beam sensor 38 and the light beam scan direction. A light beam from a single semiconductor laser is scanned from the left to the right by the rotation of the polygon mirror 35, and it crosses over the light beam sensor 38.

The light beam sensor 38 comprises two vertically elongated sensor patterns S1 and S4, a pair of sensor patterns S2 and S3 sandwiched between the sensor patterns S1 and S4, and a holder plate 38a which holds the sensor patterns S1 to S4 as one body.

The sensor pattern S1 is a pattern for sensing the passage of the light beam and producing a reset signal (integration start signal) for an integrator (to be described later). The reset signal is a signal for discharging the charge accumulated in an integration capacitor to a reference voltage. The moment the resetting is effected, an integration operation starts.

The sensor pattern S4 is a pattern for similarly sensing the passage of the light beam and producing a conversion start signal for a signal converter (an A/D converter or a window comparator) for converting an analog signal to a digital signal (as will be described later). In the case of the A/D converter, the conversion start signal serves as an A/D conversion start signal. In the case of the window comparator, the conversion start signal is used as a timing signal for holding a comparator output.

The paired sensor patterns S2 and S3 are patterns for sensing the light beam passage position. The outputs from the sensor patterns S2 and S3 vary successively in accordance with the change in the light beam passage position (a sub-scan-directional position in a direction perpendicular to the direction of scanning of the light beam). Specifically, the sensor patterns S2 and S3 produce light beam passage position signals.

The sensor patterns S2 and S3 are triangular or trapezoidal and are disposed symmetrical. A predetermined interval is provided between the sensor patterns S2 and S3 in the beam scan direction (main scan direction). As is shown in FIG. 4, the distance over which the light beam crosses the sensor pattern S2 gradually increases toward the upper part of the sensor pattern S2 in the figure. On the other hand, the distance over which the light beam crosses the sensor pattern S3 gradually increases toward the lower part of the sensor pattern S3 in the figure.

Specifically, relative to the variation in the beam passage position in the direction perpendicular to the beam scan direction, the output of one of the sensor patterns, S2 (or S3), increases successively while the output of the other sensor patterns S3 (or S2) decreases successively.

The sensor patterns S1 to S4 are composed of photodetector elements such as photodiodes, and they are formed integrally on the holder plate 38a. In this embodiment, the upper sides and lower sides of the sensor patterns S2 and S3 are aligned. However, the two sensor patterns may be vertically displaced from each other.

Figure 5A:
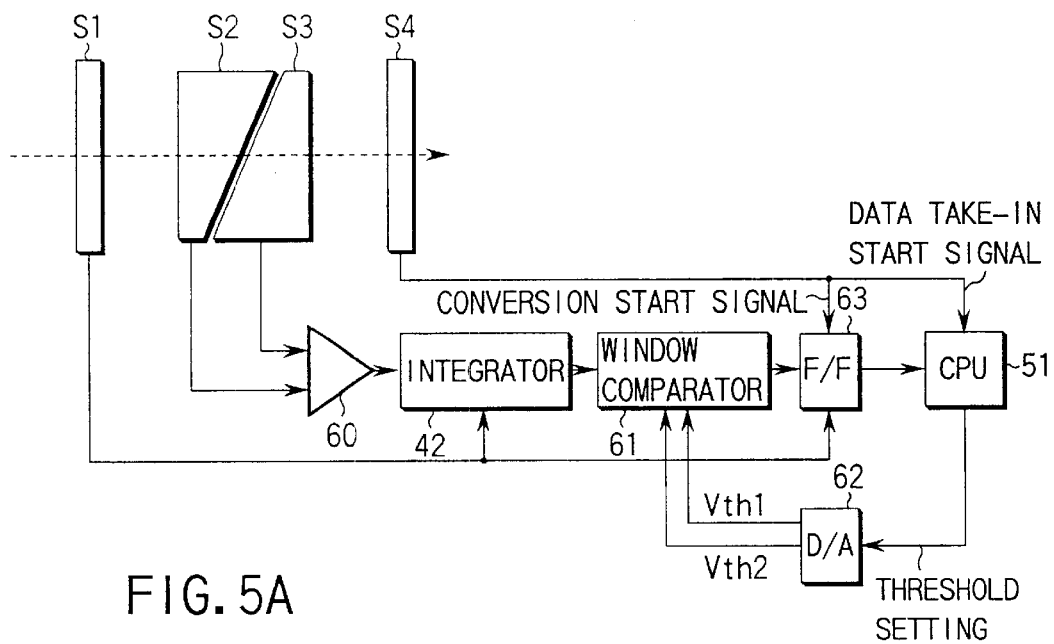
FIGS. 5A and 5B are block circuit diagrams showing main parts of an output process circuit for processing an output from the light beam sensor shown in FIG. 4.

FIG. 5A shows a main part of the beam sensor output process circuit 40 in the case of using the light beam sensor 38 shown in FIG. 4.

As has been described above, the sensor patterns S1 and S4 output pulse signals indicating the passage of the light beam, and the sensor patterns S2 and S3 output signals each having a duration varying in accordance with the light beam passage position.

The output signals from the sensor patterns S2 and S3 are delivered to input terminals of a differential amplifier 60. An output signal from the differential amplifier 60 is input to an integrator 42 serving as integration means and it is integrated there. The pulse signal from the sensor pattern S1 is also input to the integrator 42. The pulse signal from the sensor pattern S1 is used as a reset signal (integration start signal) for resetting the integrator 42 and, at the same time, starting a new integration operation. Accordingly, when the light beam has passed over the sensor pattern S1, the integrator 42 is reset and begins a new integration operation for integrating the output from the differential amplifier 60.

An output from the integrator 42 is input to a window comparator 61 serving as converter means. The window comparator 61 converts the integration output (analog signal) from the integrator 42 to a digital signal. Two threshold values are set in the window comparator 61 by the main control unit (CPU) 51 via a D/A converter 62.

An output (2-bit) from the window comparator 61 is delivered to a flip-flop circuit (F/F) 63 and retained there. Pulse signals from the sensor patterns S1 and S4 are also delivered to the flip-flop circuit 63. The flip-flop circuit 63 is cleared by the pulse signal from the sensor pattern S1, and the flip-flop circuit 63 is made to hold the output from the window comparator 61 by the pulse signal from the sensor pattern S4.

An output (2-bit) from the flip-flop circuit 63 is delivered to the main control unit 51. In addition, the pulse signal from the sensor pattern S4 is input as a data take-in start signal (interrupt signal) to the main control unit 51. After receiving the data take-in start signal from the sensor pattern S4, the main control unit 51 reads in the output from the flip-flop circuit 36 and acquires latest beam passage position information.

Figure 5B:
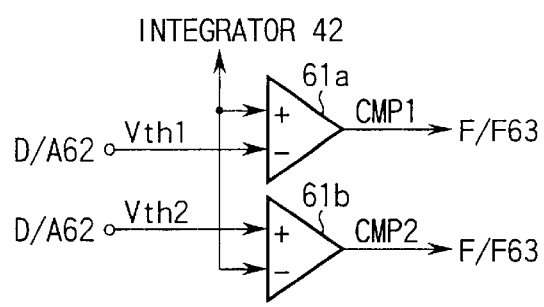

FIG. 5B shows the structure of the window comparator 61. The output from the integrator 42 is supplied to, for example, a non-inversion input terminal of a comparator 61a and an inversion input terminal of a comparator 61b. One of outputs, Vth1, from the D/A converter 62 is delivered to an inversion input terminal of the comparator 61a, and the other output Vth2 from the D/A converter 62 is delivered to a non-inversion input terminal of the comparator 61b. The D/A converter 62 comprises two D/A converter elements. The CPU 51 delivers two threshold values Vth1 and Vth2 to the window comparator 61 via the D/A converter 62. Where the output voltage of the integrator 42 is lower than Vth1 and higher than Vth2, both comparators 61a and 61b output "1". When the output of the window comparator 61, that is, the output of the F/F circuit 63, is "1,1", the CPU 51 determines that the output of the integrator 42 is present in a window defined by threshold values Vth1 and Vth2. The CPU 1 operates to gradually narrow the width of this window and vary the position, thereby exactly determining the output voltage of the integrator 42, i.e. the beam passage position information. On the basis of the acquired beam passage position information, the main control unit 51 controls the light beam passage position.

Although not shown in FIG. 5A, there are actually provided signal processing circuits such as a current/voltage conversion amplifier for converting an output current of each sensor pattern to a voltage value and a digitizing circuit for digitizing an output of the current/voltage conversion amplifier.

Referring to FIG. 5A, a description will now be given of a process operation in a case where the light beam passes over the light beam sensor 38 shown in FIG. 4.

A light beam is scanned by the polygon mirror 35 in a direction of the arrow indicated in FIG. 5A. As the light beam is passing over the sensor patterns S1 to S4, these sensor patterns S1 to S4 produce electric currents. The current from the sensor pattern S1 is converted to a voltage value by the current/voltage conversion amplifier (not shown) and this voltage value is digitized by the digitizing circuit (not shown). The resultant digital signal is input to the integrator 42 as a result signal. Thus, the integrator 42 is reset. This reset signal serves also a clear signal for clearing the flip-flop circuit 63. Thus, the flip-flop circuit 63 is cleared.

When the light beam passes over the sensor patterns S2 and S3, the sensor patterns S2 and S3 produce pulse-shaped currents in accordance with the scan position of the light beam. The output currents are converted to voltage values by the current/voltage conversion amplifiers (not shown). A difference between the converted voltage values is amplified by the differential amplifier 60 and integrated by the integrator 42. An output from the integrator 42 is input to the window comparator 61 functioning as an analog/digital converter and compared with the threshold values delivered via the D/A converter 62. Thus, the output form the integrator 42 is converted to digital signals.

When the light beam passes over the sensor pattern S4, the sensor pattern produces an output current and this output current is converted to a voltage value by the current/voltage conversion amplifier (not shown). The voltage value is digitized by the digitizing circuit. The resultant digital signal is input to the flip-flop circuit 63. At the timing of a front edge of this digital signal, the output of the window comparator 61 is held by the flip-flop circuit 63.

The signal from the sensor pattern S4 is also input to the main control unit 51 as an interrupt signal. At the timing of a rear edge of the digital signal, the main control unit 51 reads in the output of the window comparator 61, that is, the output of the flip-flop circuit 63.

FIG. 6A to FIG. 6C show outputs from the sensor patterns in accordance with the light beam passage positions, outputs from the differential amplifier, and outputs from the integrator.

Where the beam passage position is P1, the distance over which the light beam passes over the sensor pattern S2 is D1 and the distance over which the light beam passes over the sensor pattern S3 is D4. Accordingly, the outputs from the sensor patterns S2 and D3 (outputs from the current/voltage conversion amplifiers) have signal waveforms as shown in FIG. 6A, which have pulse widths proportional to the time periods during which the light beam passes over the distances D1 and D4.

As has been described above, the sensor patterns S1 to S4 are composed of photodetector elements such as photodiodes, and they produce electric currents substantially proportional to the amount of incident light. Accordingly, the amplitudes of outputs from the current/voltage conversion amplifiers are substantially equal.

The difference between the outputs from the sensor patterns S2 and S3 is amplified by the differential amplifier 60, as has already been described above. As a result, the integration output of the integrator 42 has a signal waveform as shown in FIG. 6A. Specifically, where the output from the sensor pattern S2 is greater than that from the sensor pattern S3, the output from the integrator 42 is higher than a reference voltage Vref of the process circuit (V1).

Where the beam passage position is P2, the distance over which the light beam passes over the sensor pattern S2 is D2 and the distance over which the light beam passes over the sensor pattern S3 is D5, as shown in FIG. 6B. Accordingly, the outputs from the sensor patterns S2 and D3 (outputs from the current/voltage conversion amplifiers) have signal waveforms as shown in FIG. 6B, which have pulse widths proportional to the time periods during which the light beam passes over the distances D2 and D5. Since D2=D5 in FIG. 6B, the outputs from the sensor patterns S2 and S3 are equal.

The difference between the outputs from the sensor patterns S2 and S3 is amplified by the differential amplifier 60. As a result, the integration output of the integrator 42 has a signal waveform as shown in FIG. 6B. Specifically, where the output from the sensor pattern S2 is equal to that from the sensor pattern S3, the output from the integrator 42 is equal to the reference voltage Vref of the process circuit (V2=Vref).

Where the beam passage position is P3, the distance over which the light beam passes over the sensor pattern S2 is D3 and the distance over which the light beam passes over the sensor pattern S3 is D6, as shown in FIG. 6C. Accordingly, the outputs from the sensor patterns S2 and D3 (outputs from the current/voltage conversion amplifiers) have signal waveforms as shown in FIG. 6C, which have pulse widths proportional to the time periods during which the light beam passes over the distances D3 and D6. Since D3<D6 in FIG. 6C, the output from the sensor pattern S3 is greater than that from the sensor pattern S2.

The difference between the outputs from the sensor patterns S2 and S3 is amplified by the differential amplifier 60. As a result, the integration output of the integrator 42 has a signal waveform as shown in FIG. 6C. Specifically, where the output from the sensor pattern S3 is greater than that from the sensor pattern S2, the output from the integrator 42 is lower than the reference voltage Vref of the process circuit (V3).

The light beam passage position can thus be determined by integrating the difference between the outputs from the sensor patterns S2 and S3.

At the timing of the output signal from the sensor pattern S4, the integration output from the integrator 42, after digitized by the window comparator 61, is taken in the main control unit 51.

Figure 7:
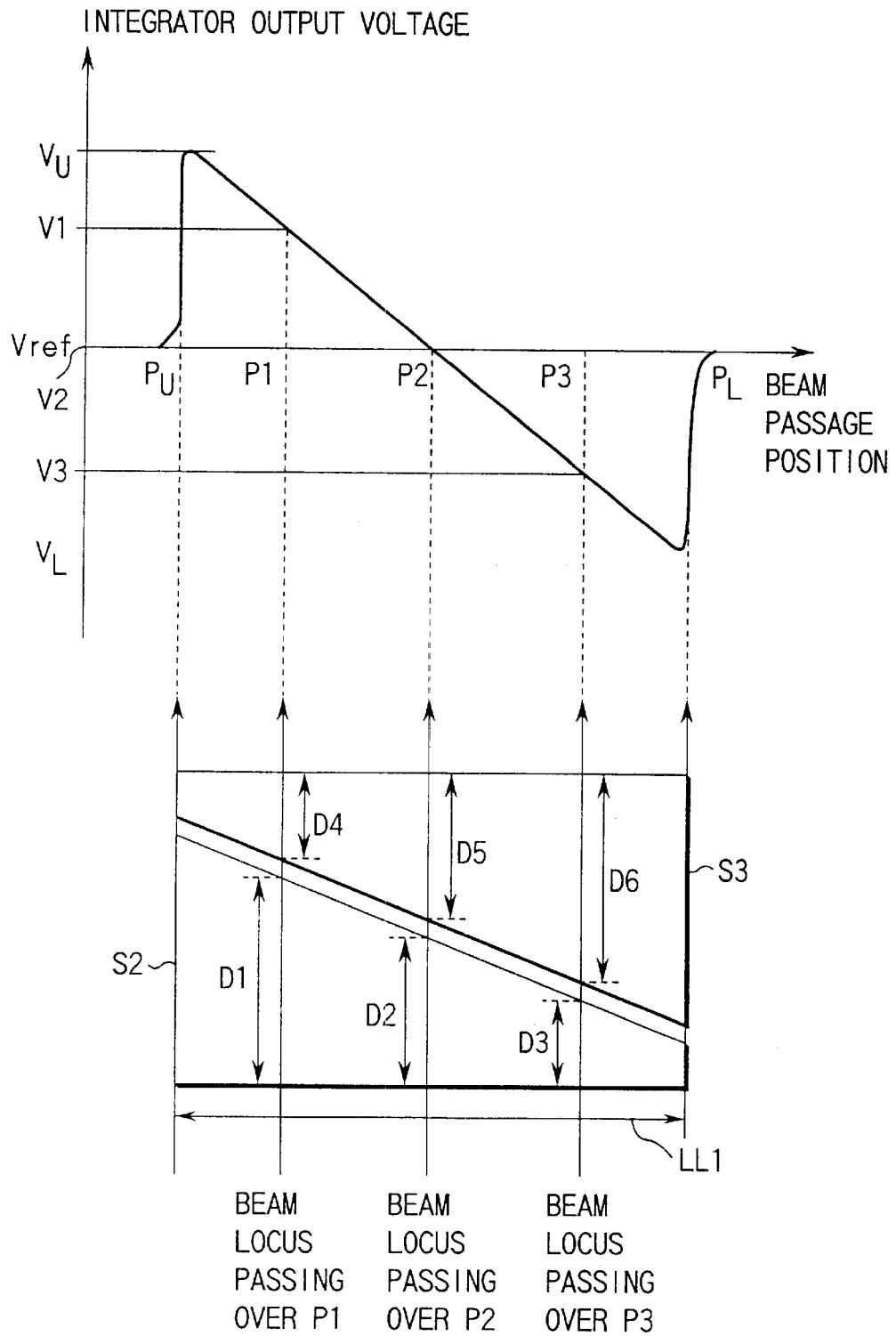
FIG. 7 is a graph showing a relationship between the light beam passage position and an output from an integrator.

FIG. 7 illustrates the relationship between the light beam passage position and the output from the integrator. For the purpose of reference, the integration outputs in the case where the light beam passage positions are P1, P2 and P3, as described above, are also plotted. The integrator 42 outputs a reference voltage Vref when the beam passage position is P2 (i.e. when the distance over which the light beam passes over the sensor pattern S2 is equal to the distance over which the light beam passes over the sensor pattern S3). When the beam passage position is higher than P2 (on the left side in FIG. 7), the output of the integrator 42 is greater than Vref. When the beam passage position is lower than P2 (on the right side in FIG. 7), the output of the integrator 42 is less than Vref.

A description will now be given of a specific example wherein the power supply voltage of the beam sensor output process circuit 40 is 5[V] and the sub-scan-directional dimension (LL1) of the sensor pattern S2, S3 is 1900[$\mu$m].

The reference voltage Vref is 2.5[V] which is half the power supply voltage of 5[V]. Taking into account the output voltage of the operational amplifier constituting the integrator 24, the range of output voltage of the integrator 42 is set in a range of 1.0 to 4.0[V]. The reason is that the range of output voltage of an ordinary operational amplifier is narrower than the range of power supply voltage. Accordingly, the range of the output voltage of the integrator 42 is set between the upper limit ($V_U$) of 4.0[V] and the lower limit ($V_L$) of 1.0[V], with the reference voltage set at 2.5[V].

On the other hand, since the sub-scan-directional dimension (LL1) of the sensor pattern S2, S3 is 1900[$\mu$m], the output of the integrator 42 is Vref when the light beam passes over the middle point P2 (950[$\mu$m]). In addition, the output of the integrator 42 is $V_U$ when the light beam passes over position Put and $V_L$ when it passes over position $P_L$. That is, the integration output is about 1.58[mV/$\mu$m].

Accordingly, when the target beam passage position is set at P2, the integration output is monitored and the galvanomirror is adjusted so that the integration output may coincide with the reference voltage Vref. Thus, the light beam passage position is controlled.

A second embodiment of the present invention will now be described.

In the second embodiment, this invention is applied to a light beam scanning apparatus having a multi-beam optical system wherein the above-described light beam sensor 38 shown in FIG. 4 is scanned using a plurality (e.g. four) of light beams. Since the principles of light beam passage position sensing and control according to the second embodiment are the same as those according to the first embodiment, a description thereof is omitted. The structure of the multi-beam optical system has already been described above with reference to FIG. 2, and so a description thereof is omitted.

A description will now be given of a multi-beam passage position control using the light beam sensor 38 shown in FIG. 4. Assume that the multi-beam optical system is a four-beam optical system having four lasers and four actuators (galvanomirrors in this embodiment) for moving the respective light beams in the sub-scan direction. In addition, assume that the multi-beam optical system has a resolution of, e.g. 600 dpi.

As has been described in connection with the first embodiment, the light beam sensor 38 has sensing characteristics as illustrated in FIG. 7. Since the integration output is about 1.58[mV/$\mu$m], in order to control the pitch of the four beams at 600 dpi, it should suffice if the galvanomirrors are adjusted such that the difference in integration output between adjacent light beams may become 66.8[mV] (1.58 [mV/$\mu$m] ×42.3[$\mu$m]).

For example, in order to set the target beam passage position of the first light beam at P2, the first laser is activated to emit light and the polygon mirror is rotated. The galvanomirror for the first light beam is actuated so as to make the first beam pass over the range of the sensor patterns. If the first beam is made to pass over the range of the sensor patterns, the beam passage position of the first beam is adjusted using the galvanomirror so that the integration output may become Vref.

Then, the beam passage position of the second light beam is controlled. The second laser is activated to emit light and the polygon mirror is rotated. Like the case of the first beam, the galvanomirror for the second light beam is actuated so as to make the second beam pass over the range of the sensor patterns. Then, the beam passage position of the second beam is adjusted using the galvanomirror for the second beam so that the integration output may become Vref−66.8 [mV].

According to the above operation, the pitch of the beam passage positions of the first and second light beams is controlled at 42.3[$\mu$m]. Similarly, as regards the third and fourth light beams, the associated galvanomirrors are adjusted so that the difference in integration output between the adjacent beams may become 66.8[mV] corresponding to 42.3[$\mu$m].

With the above operations, the beam passage positions of the four beams are controlled with the pitch of 42.3[μm]. In this way, the beam passage positions of the four beams can be controlled with a desired pitch.

A third embodiment of the invention will now be described.

In the third embodiment, like the second embodiment, this invention is applied to a light beam scanning apparatus having a multi-beam optical system. The third embodiment differs from the second embodiment in that at least one of a plurality of light beams is fixed. In the third embodiment, with reference to the beam passage position of the fixed light beam, the beam passage positions of the other light beams are controlled (relative position control) with a predetermined pitch.

Figure 8:
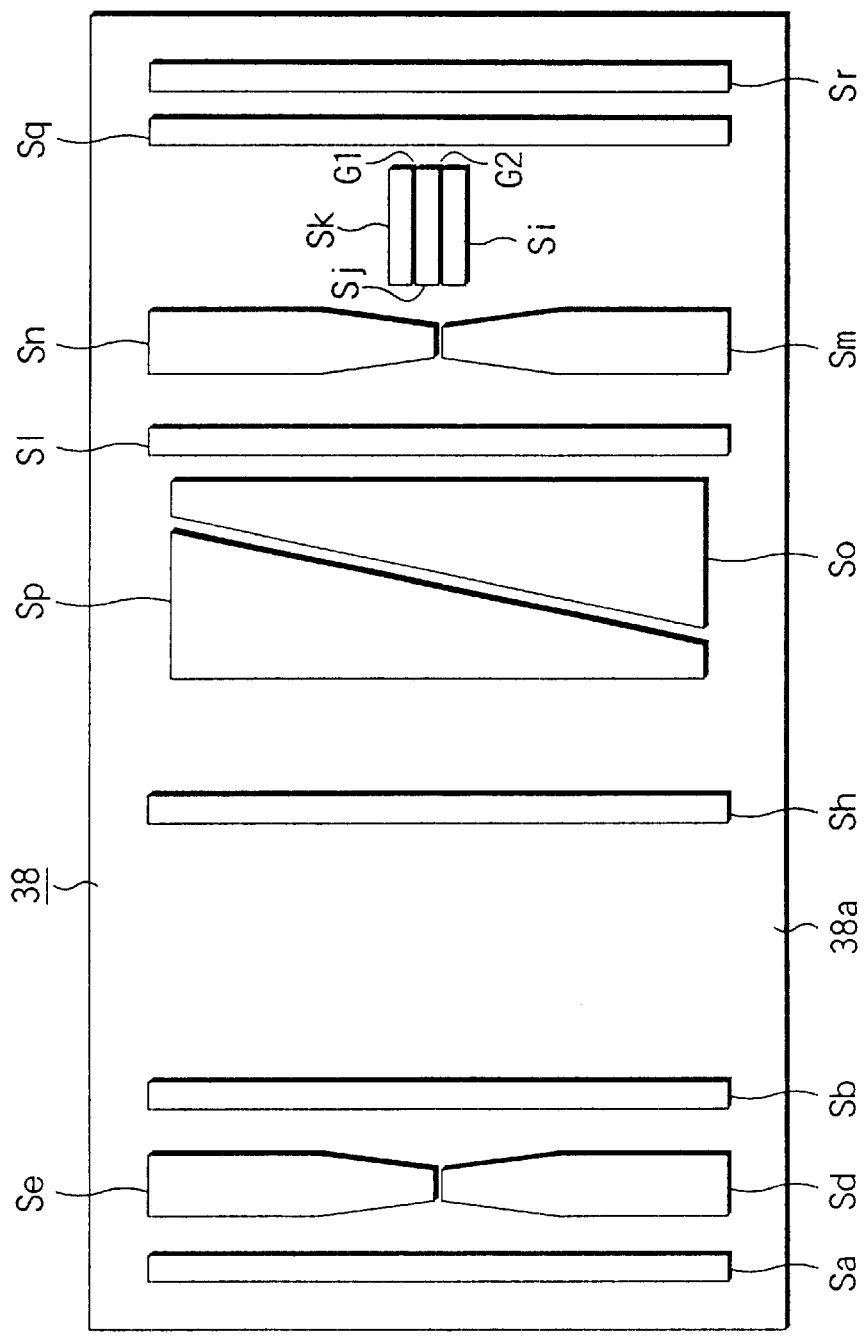
FIG. 8 schematically shows a structure of a light beam sensor according to a third embodiment of the invention.

FIG. 8 shows a structure of the light beam sensor 38 according to the third embodiment. The light beam sensor 38 comprises sensor patterns Sa, Sd, Se, Sb, Sh, So, Sp, Sl, Sm and Sn elongated in a direction perpendicular to the beam scan direction; sensor patterns Si, Sj and Sk elongated in the beam scan direction; sensor patterns Sq and Sr elongated in the direction perpendicular to the beam scan direction; and a holder plate 38a holding all of these sensor patterns.

The sensor patterns So and Sp correspond to the sensor patterns S3 and S2 shown in FIG. 4 and have similar shapes to the sensor patterns S3 and S2. In FIG. 4, the sensor pattern S1 produces the reset signal for the integrator 42. However, in FIG. 8, the two sensor patterns Sa and Sh produce reset signals for the integrator 42. In FIG. 4, the front edge of the output signal from the sensor pattern S4 is used as the conversion start timing signal for A/D converting the integration output, and the rear edge of the output signal from the sensor pattern S4 is used as the read-in timing signal for taking data into the main control unit 51. However, in FIG. 8, an output signal from the sensor pattern S1 is used as the conversion start timing signal, and an output signal from the sensor pattern Sr is used as the read-in timing signal.

The sensor patterns Si, Sj and Sk are disposed at a substantially central position in the sub-scan direction on the holder plate 38a, and they are arranged in parallel in the sub-scan direction with a pitch of 42.3[μm] (resolution: 600 dpi). The sub-scan-directional position of a gap G1 between the sensor patterns Sj and Sk is a first target beam passage position. The sensor patterns Sj and Sk are used to confirm that the light beam is passing over the first target beam passage position. The sub-scan-directional position of a gap G2 between the sensor patterns Si and Sj is a second target beam passage position. The sensor patterns Si and Sj are used to confirm that the light beam is passing over the second target beam passage position.

The sensor patterns Sd and Se and the sensor patterns Sm and Sn are patterns for detecting an inclination of the scanning light beam relative to the light beam sensor 38. The sensor patterns Sd and Se and the sensor patterns Sm and Sn are paired, respectively, and are vertically disposed. The center position between the sensor patterns Sd and Se and the center position between the sensor patterns Sm and Sn are located on the same straight line.

Figure 9:
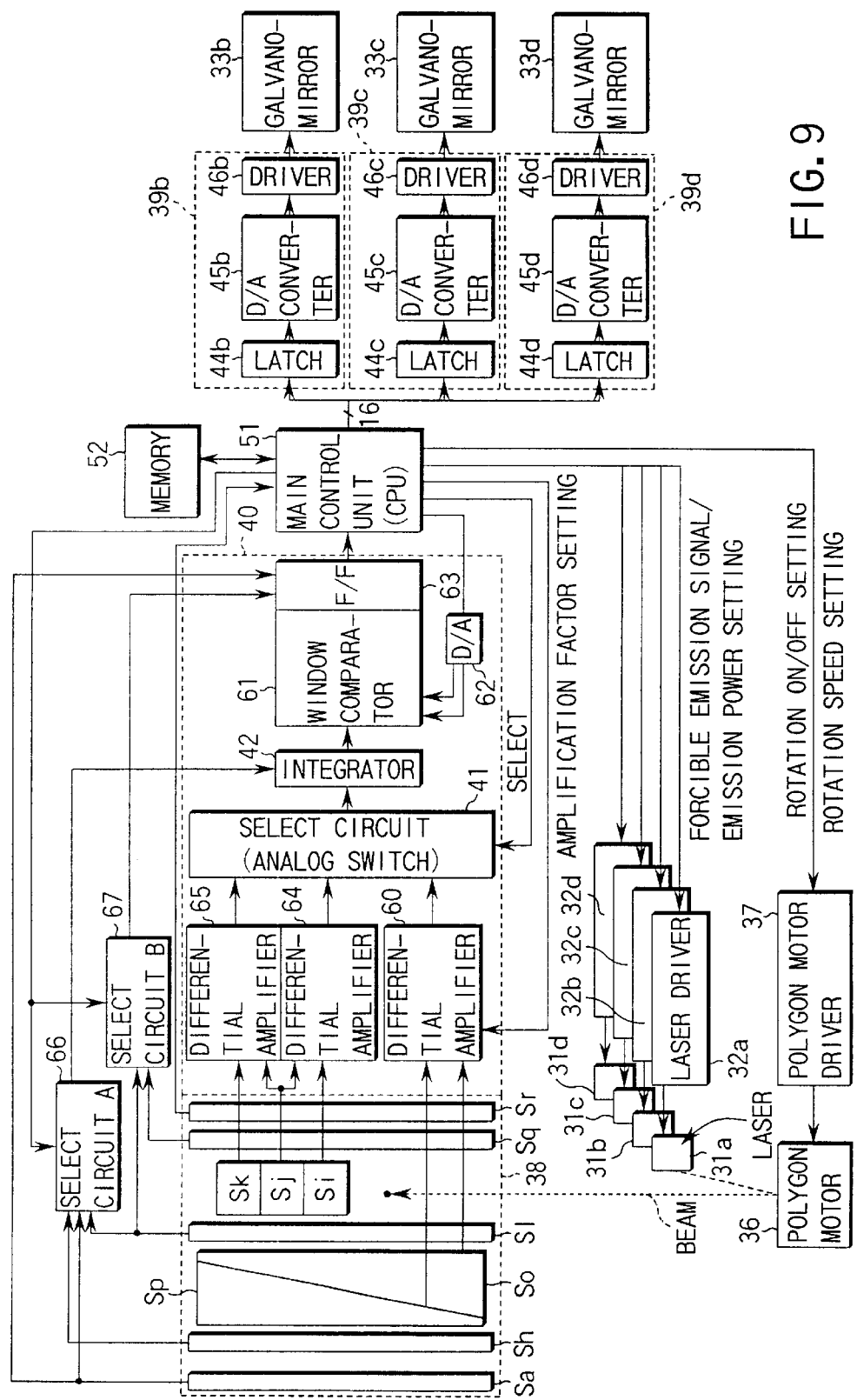
FIG. 9 is a block diagram showing the structures of the light beam sensor output process circuit and its peripheral sections in the case of using the light beam sensor in FIG. 8.

FIG. 9 shows structures of the beam sensor output process circuit 40 and its peripheral sections in the case of using the light beam sensor 38 shown in FIG. 8.

Output signals from the sensor patterns So and Sp are delivered to input terminals of the differential amplifier 60. Output signals from the sensor patterns Si and Sj are delivered to input terminals of a differential amplifier 64. Output signals from the sensor patterns Sj and Sk are delivered to input terminals of a differential amplifier 65. The main control unit (CPU) 51 can set amplification factors of the differential amplifiers 60, 64 and 65.

Output signals from the differential amplifiers 60, 64 and 65 are delivered to a select circuit (analog switch) 41. In accordance with a sensor select signal from the main control unit 51, the select circuit 41 selects one of the output signals to be input to the integrator 42. The signal selected by the select circuit 41 is input to the integrator 42 and integrated.

An output signal from the integrator 42 is input to the window comparator 61. The window comparator 61 converts the integration output (analog signal) from the integrator 42 to a digital signal. Threshold values are set in the window comparator 61 by the main control unit 51 via the D/A converter 62. An output from the window comparator 61 is delivered to the flip-flop (F/F) circuit 63 and retained there. An output from the flip-flop circuit 63 is input to the main control unit 51.

An output signal from the sensor pattern Sa is delivered to the flip-flop circuit 63 as a clear signal. Output signals from the sensor patterns Sa, Sh and Sl are delivered to a select circuit (A) 66. In response to a select signal from the main control unit 51, the select circuit 66 produces a reset signal on the basis of the output signals from the sensor patterns Sa, Sh and Sl and resets the integrator 42. After reset by the reset signal, the integrator 42 starts an integration operation.

Output signals from the sensor patterns Sl and Sq are delivered to a select circuit (B) 67. In response to a select signal from the main control unit 51, the select circuit 67 selects one of the output signals from the sensor patterns Sl and Sq and supplies it to the flip-flop circuit 63 as a conversion start signal. An output signal from the sensor pattern Sr is delivered to the main control unit 51 as an interrupt signal.

Upon receiving the interrupt signal from the sensor pattern Sr, the main control unit 51 reads in the output from the flip-flop circuit 63 and acquires latest information on the beam passage position. On the basis of the acquired beam passage position information, the main control unit 51 calculates control amounts for the galvanomirrors 33b, 33c and 33d. The calculation results are stored in the memory 52 on an as-needed basis and delivered to the galvanomirror drive circuits 39b, 39c and 39d.

The galvanomirror drive circuits 39b, 39c and 39d include latches 44b, 44c and 44d for holding the calculation results. If data is once written by the main control unit 51, the data (value) is retained until it is updated.

The data retained in the latches 44b, 44c and 44d is converted to analog signals (voltage) by D/A converters 45b, 45c and 45d. The analog signals are input to drivers 46b, 46c and 46d for driving the galvanomirrors 33b, 33c and 33d. On the basis of the analog signals (voltage) input from the D/A converters 45b, 45c and 45d, the drivers 46b, 46c and 46d drive the galvanomirrors 33b, 33c and 33d.

Accordingly, in the present embodiment, the semiconductor lasers which emit light beams to be controlled are driven, the output of the window comparator 61 is read in, and the galvanomirrors 33b, 33c and 33d are controlled on the basis of read-in information. Thereby, the light beam passage positions can be controlled.

Although not shown in FIG. 9, there are actually provided signal processing circuits such as a current/voltage conversion amplifier for converting an output current of each sensor pattern to a voltage value and a digitizing circuit for digitizing an output of the current/voltage conversion amplifier.

In the structure shown in FIG. 9, when the light beam passage position sensing and control are performed using the sensor patterns Sp and So, the main control unit 51 delivers to the select circuit 41 a select signal for selecting the differential amplifier 60. The sensor patterns Sp and So are thus selected. Similarly, the main control unit 51 delivers sensor select signals to the select circuits 66 and 67. Thus, the reset signal for the integrator 42 and the digital/analog conversion start signal are generated. In this case, the reset signal for the integrator 42 rises at the timing of the front edge of the output from the sensor pattern Sa, and falls at the timing of the rear edge of the output from the sensor pattern Sh. The conversion start signal is produced on the basis of the output signal from the sensor pattern Sl.

Where the light beam passage position sensing and control are performed using the sensor patterns Si and Sj or the sensor patterns Sj and Sk, the main control unit 51 delivers to the select circuit 41 a select signal for selecting the differential amplifier 64 or 65, thereby selecting either pair of the sensor patterns Si and Sj or the sensor patterns Sj and Sk. Similarly, the main control unit 51 delivers sensor select signals to the select circuits 66 and 67, thereby producing the reset signal for the integrator 42 and the digital/analog conversion start signal. In this case, the reset signal for the integrator 42 rises at the timing of the front edge of the output from the sensor pattern Sa, and falls at the timing of the rear edge of the output from the sensor pattern Sl. The conversion start signal is produced on the basis of the output signal from the sensor pattern Sq.

Whichever sensor patterns are selected, the integration output of the integrator 42 which is held in the flip-flop circuit 63 is read in the main control unit 51 at the timing of the outputting of the signal from the sensor pattern Sr.

As has been described above, since one of the four light beams is fixed, three galvanomirrors are used to move the other three light beams in the sub-scan direction. Specifically, the galvanomirrors 33b, 33c and 33d are used for the second, third and fourth light beams.

With reference to a flow chart of FIG. 10, a description will now be given of the light beam relative-position control by the multi-beam optical system according to the third embodiment of the invention.

To start with, a fixed light beam is emitted with predetermined power (ST101). Specifically, the main control unit 51 delivers a predetermined instruction value to, for instance, the first laser driver 32a, and enables the first laser 31a to emit a first light beam with predetermined power. At the same time, the polygon mirror 35 is rotated.

Subsequently, the main control unit 51 delivers to the select circuit 41 a select signal for selecting the differential amplifier 60. Thus, a differential output between the outputs from the sensor patterns Sp and So is sent to the integrator 42. Similarly, the main control unit 51 delivers sensor select signals to the select circuits 66 and 67 so that the reset signal and analog/digital conversion start signal may be produced at the time of integrating the differential signal between the outputs from the sensor patterns Sp and So. According to this step, the main control unit 51 can take in the differential output between the outputs from the sensor patterns Sp and So.

After the above setting is completed, the main control unit 51 reads in the differential output representing the difference between the outputs from the sensor patterns Sp and So (ST102). Specifically, the beam passage position of the first light beam, or the fixed light beam serving as a reference beam, is sensed using the differential output associated with the sensor patterns Sp and So. In the subsequent steps, the beam passage positions of the other three light beams are controlled to have a predetermined pitch (e.g. 24.3 μm) by using the beam passage position of the first light beam, which has been detected in this step, as a reference position.

The second light beam, which is movable, is emitted with predetermined power (ST103). The main control unit 51 delivers a predetermined instruction value to, for instance, the second laser driver 32b, and enables the second laser 31b to emit the second light beam with predetermined power.

Since the main control unit 51 is monitoring the differential output between the outputs from the sensor patterns Sp and So, it can determine the beam passage position of the second light beam. The main control unit 51 actuates the galvanomirror 33b so that the second light beam may pass over the sensing range of the sensor patterns Sp and So (ST104). Thereafter, the main control unit 51 actuates the galvanomirror 33b so that the second light beam may pass near the center region in the sub-scanning direction, of the sensor patterns Sp and So. In this step high precision is not required for the adjustment of the beam passage position.

Subsequently, the second light beam roughly adjusted in step ST104 is controlled so that its passage position may coincide with the center of the gap between the sensor patterns Sk and Sj (ST105). The sensor patterns Si, Sj and Sk are disposed at a substantially central position of the sensor patterns Sp and So. Accordingly, without the need to greatly vary the light beam passage position (in addition, without the need to consume much time), the beam passage position of the second light beam can be controlled at the center of the gap between the sensor patterns Sk and Sj. The process in step ST105 will now be described in greater detail.

The main control unit 51 delivers to the select circuit 41 a select signal for selecting the differential amplifier 65. Thus, a differential output between the outputs from the sensor patterns Sk and Sj is sent to the integrator 42. Similarly, the main control unit 51 delivers sensor select signals to the select circuits 66 and 67 so that the reset signal and analog/digital conversion start signal may be produced at the time of integrating the differential signal between the signals from the sensor patterns Sk and Sj. According to this step, the main control unit 51 can take in the differential output between the outputs from the sensor patterns Sk and Sj.

Then, the galvanomirror 33b for the second light beam is actuated to control the beam passage position of the second light beam so that it may come to the center of the gap between the sensor patterns Sk and Sj. In order to actuate the galvanomirror 33b, the main control unit 51 first sets an instruction value in the D/A converter 45b. An analog signal produced by the D/A converter 45b is input to the driver 46b. The driver 46b delivers to the galvanomirror 33b a current corresponding to the D/A converted value. The galvanomirror 33b operates according to the output current value from the driver 46b. Accordingly, by altering the instruction value set in the D/A converter 45b, the beam passage position of the second light beam can be varied.

While the setting of the galvanomirror 33b in step ST105 is being retained, the main control unit 51 reads in the differential output between the outputs from the sensor patterns Sp and So once again (ST106). The main control unit 51 stores this value (POkj) in the memory 52.

In the next step ST106, the second light beam, which has been controlled to pass over the center of the gap between the sensor patterns Sk and Sj, is now controlled to pass over the center of the gap between the sensor patterns Sj and Si (ST107). The main control unit 51 delivers to the select circuit 41 a select signal for selecting the differential amplifier 64. Thus, the differential output between the outputs from the sensor patterns Sj and Si is input to the integrator 42. Similarly, the main control unit 51 delivers sensor select signals to the select circuits 66 and 67 so that the reset signal and analog/digital conversion start signal may be produced at the time of integrating the differential signal between the outputs from the sensor patterns Sj and Si. According to this step, the main control unit 51 can take in the differential output between the outputs from the sensor patterns Sj and Si.

Then, like step ST105, the galvanomirror 33b for the second light beam is actuated to control the beam passage position of the second light beam so that it may come to the center of the gap between the sensor patterns Sj and Si.

While the second light beam is passing over the center of the gap between the sensor patterns Sj and Si, the main control unit 51 reads in the differential output between the outputs from the sensor patterns Sp and So once again and stores this value (POji) in the memory 52 (ST108).

Subsequently, the main control unit 51 calculates a difference between the value POkj stored in the memory 52 in step ST106 and the value POji stored in the memory 52 in step ST108 (ST109). Since the pitch between the center point between the sensor patterns Sk and Sj, on the one hand, and the center point between the sensor patterns Sj and Si, on the other, is 42.3 $\mu$m, the distance of movement of the light beam from the state in step ST105 (ST106) to the state in step ST107 (ST108) is 42.3 $\mu$m. Accordingly, the difference between POkj and POji calculated in this step is equal to the difference of the differential output between the outputs from the sensor patterns Sp and So, and it corresponds to the distance of movement of the second light beam (42.3 $\mu$m).

Then, the main control unit 51 controls the pitch between the beam passage position of the fixed light beam (first light beam) and the movable light beam (second light beam) so that it may become 42.3 $\mu$m (ST110). In the process of this step, the differential output between the outputs from the sensor patterns Sp and So is used.

Specifically, the beam passage position of the first light beam, or the fixed light beam, has already been detected in step ST102. The main control unit 51 actuates the galvanomirror 33b and controls the beam passage position of the second light beam so that beam passage position of the movable second light beam may have a pitch of 42.3 $\mu$m relative to the first light beam.

In other words, the main control unit 51 alters the beam passage position of the second light beam so that a difference between the difference value stored in step ST102, on the one hand, and the difference value between the outputs from the sensor patterns Sp and So representing the beam passage position of the second light beam, on the other, may coincide with the value (POkj-POji) found in step ST109.

According to the above-described process, the passing positions of the first and second light beams are controlled to have a pitch of 42.3 $\mu$m even if the intensities of the two beams are not equal. As regards the third and fourth beams, the same process is repeated and their pitch is controlled at 42.3 $\mu$m.

A fourth embodiment of the invention will now be described.

Figure 11:
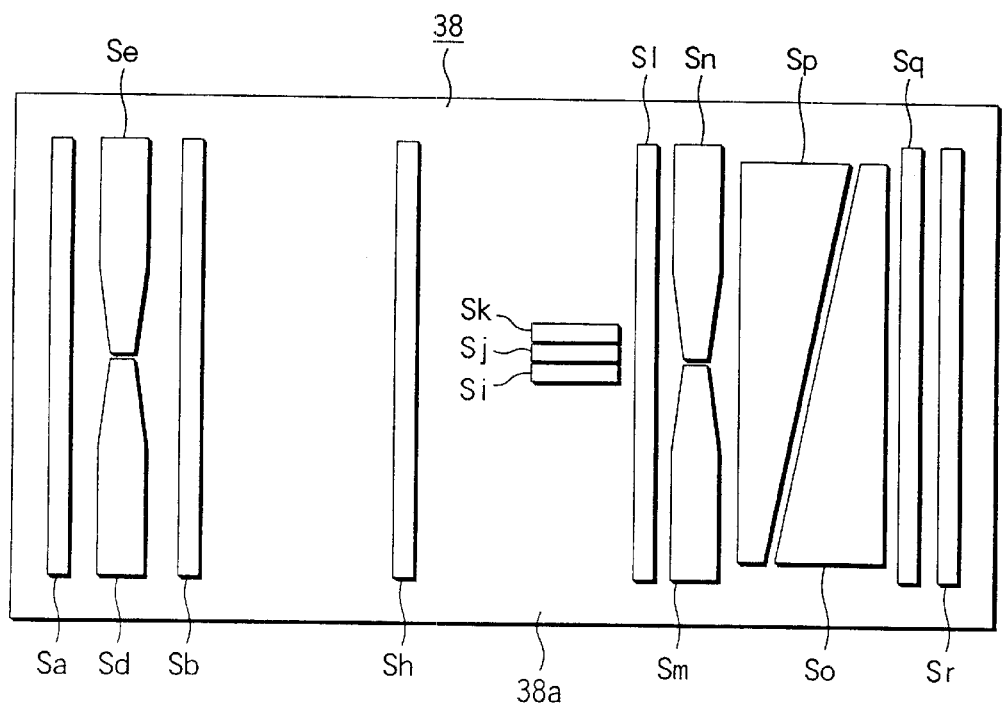
FIG. 11 schematically shows a structure of a light beam sensor according to a fourth embodiment of the invention.

In the fourth embodiment, the light beam sensor 38 shown in FIG. 8 is modified, as shown in FIG. 11, such that the sensor patterns Sp and So for sensing relative positions of the light beam are provided on a downstream side in the beam scan direction (in FIG. 8, on an upstream side). In brief, the positional relationship between the sensor patterns Sp and So and the sensor patterns Si, Sj and Sk is reversed. In the other respects, the structure in FIG. 11 is the same as that in FIG. 8.

A fifth embodiment of the invention will now be described.

In general, in the case of the multi-beam optical system, since a plurality of light beams are used, it is difficult to maintain desired control precision if the light amounts of the respective beams are greatly different from one another at the time of executing a light beam passage position control. Thus, at the time of executing a light beam passage position control, the light amounts of the respective light beams are controlled and equalized.

However, with the use of a small-diameter polygon mirror which is necessitated by an increased speed in copying operation, and with the use of an inexpensive lens which is also necessitated by cost reduction, the condition of the light beam on the light-receiving surface of the light beam sensor deteriorates (e.g. occurrence of an eclipse in the light beam). Consequently, even if the intensities of emitted light beams are equal, the light amounts thereof on the scanned surface become different. It is thus difficult to maintain desired control precision in the conventional technique for the beam passage position control.

In the fifth embodiment of the invention, the light amount of each light beam on the scanned surface is measured (or sensed) and a correction coefficient corresponding to the measured light amount is used. Thereby, desired precision for the beam passage position control can be achieved without the effect of the eclipse of the light beam, etc.

Figure 12:
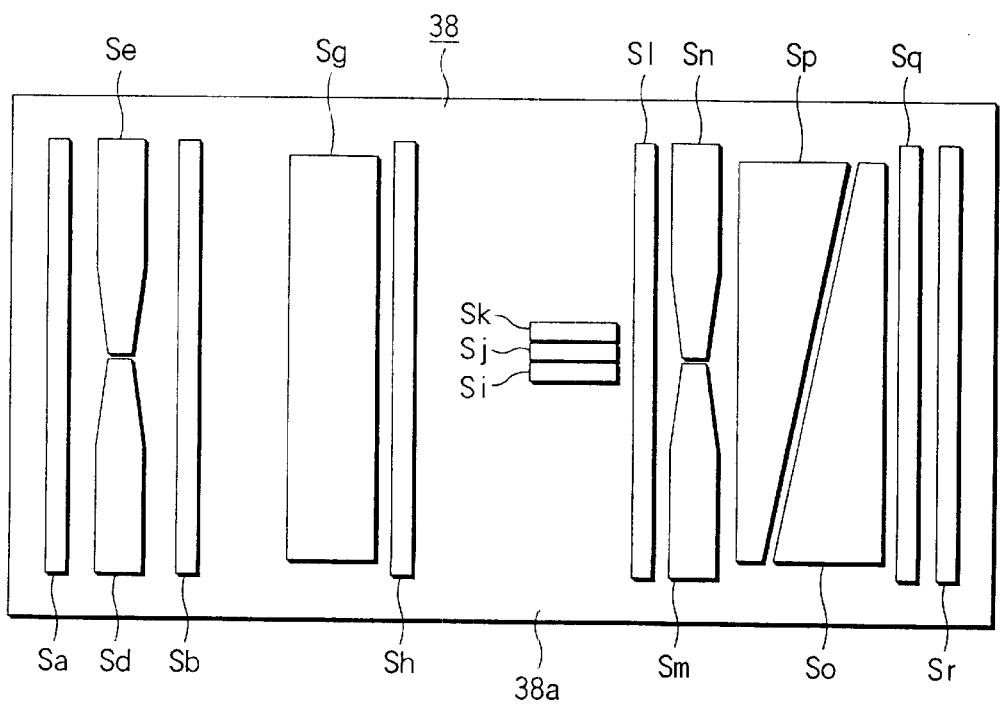
FIG. 12 schematically shows a structure of a light beam sensor according to a fifth embodiment of the invention.

FIG. 12 shows the structure of the light beam sensor 38 used in the fifth embodiment. This light beam sensor 38 has the same basic structure as the light beam sensors 38 shown in FIGS. 8 and 11. In the fifth embodiment, however, a sensor pattern Sg is provided. The sensor pattern Sg is a pattern for measuring the light amount (power) of the light beam scanned by the polygon mirror 35. The sensor pattern Sg has an elongated shape extending in a direction perpendicular to the scan direction of the light beam. The sensor pattern Sg is interposed between the sensor patterns Sb and Sh.

Like the other sensor patterns, the sensor pattern Sg is composed of a photodiode, or a photodetector element. When the sensor pattern Sg is illuminated by the light beam, it outputs an electric current proportional to the light amount of the light beam.

Figure 13:
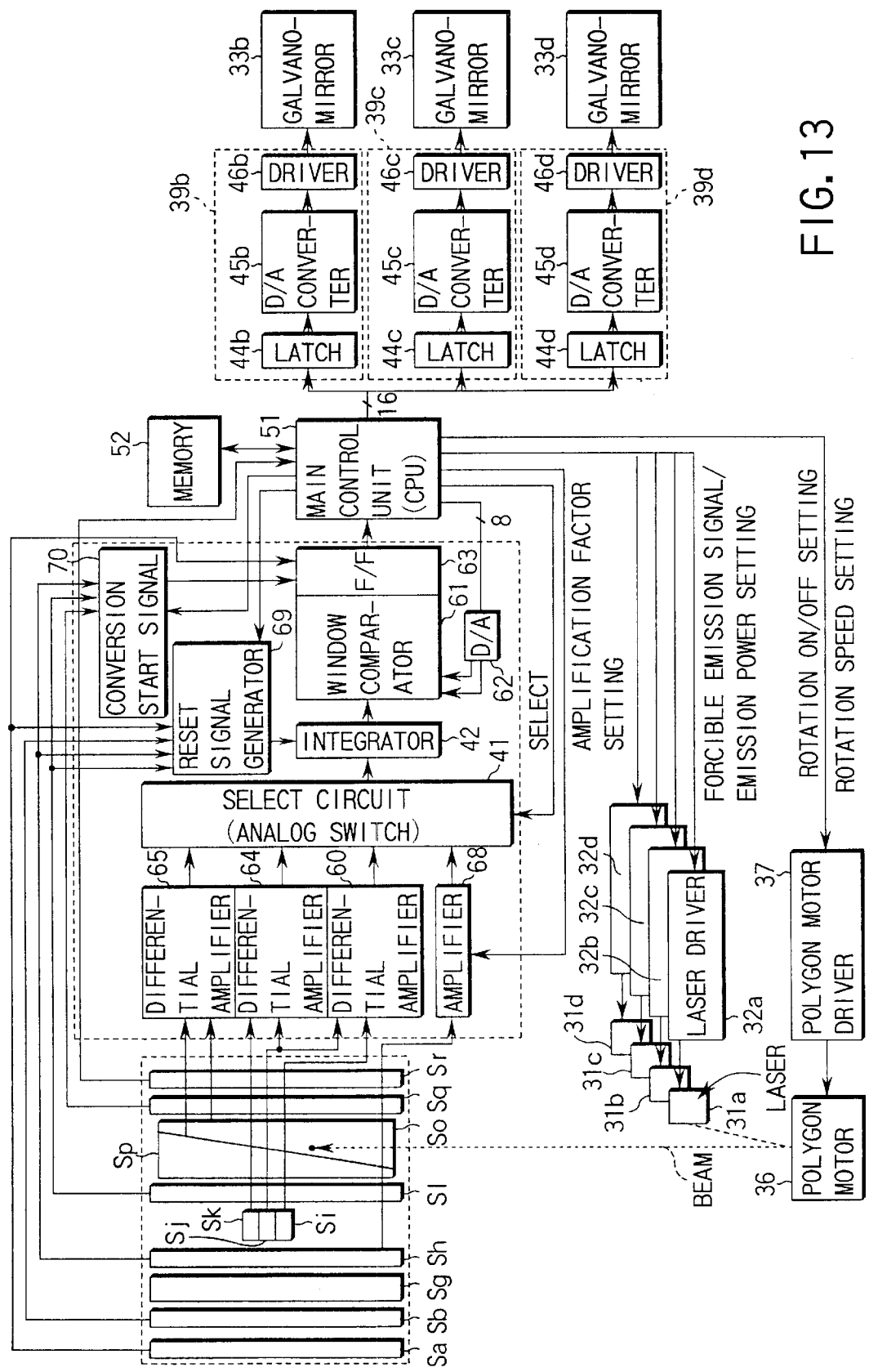
FIG. 13 is a block diagram showing the structures of the light beam sensor output process circuit and its peripheral sections in the case of using the light beam sensor shown in FIG. 12.

FIG. 13 is a block diagram showing the structures of the beam sensor output process circuit 40 and its peripheral sections in the case of using the light beam sensor 38 shown in FIG. 12. Since these structures are basically the same as those shown in FIG. 9, only different portions will be described.

An output signal from the sensor pattern Sg is converted to a voltage signal by a current/voltage conversion amplifier 68, and the voltage signal is input to the select circuit 41. The main control unit 51 can set an amplification factor of the current/voltage conversion amplifier 68.

In FIG. 13, the integrator 42 and window comparator 61 are commonly used. It is thus necessary to alter the reset signal (integration start signal) and the conversion start signal in accordance with the sensor pattern whose output is to be detected. In this embodiment, this is realized by a reset signal generator circuit 69 and a conversion start signal generator circuit 70.

The reset signal generator circuit 69 receives output signals from the sensor patterns Sa, Sb, Sh and Sl. Based on the output signals from two of these sensor patterns, the reset signal generator circuit 69 produces a reset signal for the integrator 42 and delivers it to the integrator 42. The main control unit 51 determines which of the output signals from the sensor patterns are to be combined to produce the reset signal.

The conversion start signal generator circuit 70 receives output signals from the sensor patterns Sh, Sl and Sq. The main control unit 51 can select a proper one of these output signals. The selected signal is input, as a conversion start signal, to the flip-flop circuit 63.

Specifically, in accordance with the sensor pattern to be detected, the main control unit 51 controls both the circuits 69 and 70, thereby determining which of the output signals from the sensor patterns Sa, Sb, Sh and Sl are to be combined to produce the reset signal, and selecting a proper one of the output signals from the sensor patterns Sh, Sl and Sq to produce the conversion start signal.

As has been described above, the main control unit 51 freely selects the sensor pattern to be detected, and then performs the integration and A/D conversion and takes in the acquired information as digital data.

Although not shown in FIG. 13, there are actually provided signal processing circuits such as a current/voltage conversion amplifier for converting an output current of each sensor pattern to a voltage value and a digitizing circuit for digitizing an output of the current/voltage conversion amplifier.

In the structures shown in FIG. 13, when the light amount of the light beam is measured, the main control unit 51 delivers the select signal to cause the select circuit 41 to select the amplifier 68. Thereby, the select circuit 41 selects the output from the sensor pattern Sg and inputs it to the integrator 42.

In accordance with the sensor select signal from the main control unit 51, the reset signal generator circuit 69 selects outputs from the sensor patterns Sa and Sb. The reset signal for the integrator 42 is generated at the timings of the front edge of the output signal from the sensor pattern Sa and the rear edge of the output signal from the sensor pattern Sb. The generated reset signal resets the integrator 42.

On the other hand, in accordance with the sensor select signal from the main control unit 51, the conversion start signal generator circuit 70 selects the output from the sensor pattern Sh and delivers it to the flip-flop circuit 63 as the conversion start signal.

Figure 14:
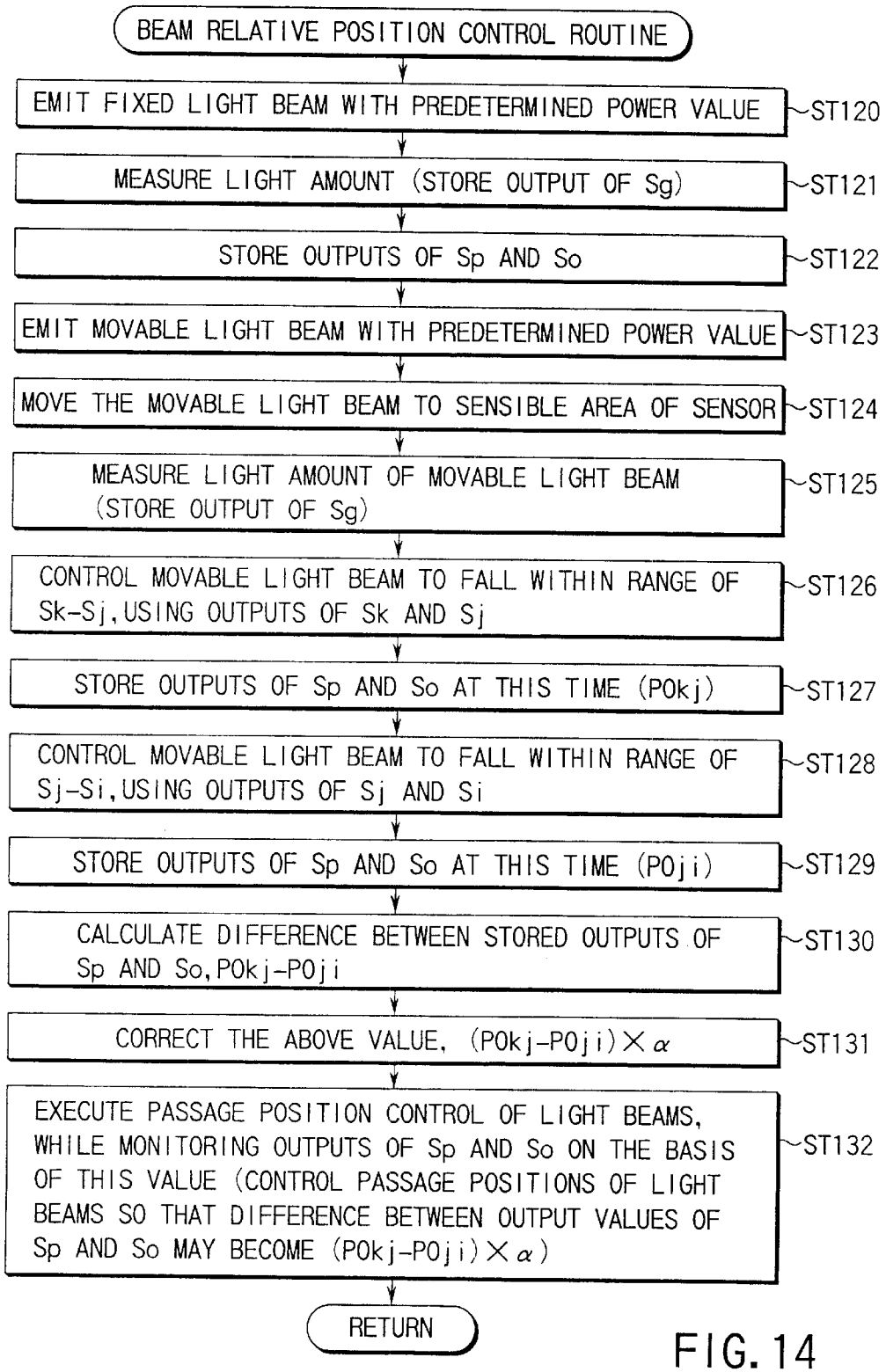
FIG. 14 is a flow chart illustrating a light beam relative position control of a multi-beam optical system according to the fifth embodiment.

Referring now to a flow chart of FIG. 14, a description will be given of the light beam relative position control for the multi-beam optical system according to the fifth embodiment.

To begin with, a fixed light beam is emitted with a predetermined power (ST120). Specifically, the main control unit 51 sends a predetermined instruction value to the first laser driver 32*a* and causes the first laser 31*a* to emit light with a predetermined power.5 At the same time, the main control unit 51 causes the polygon mirror 35 to rotate.

In order to measure the light amount of the light beam, the main control unit 51 causes the select circuit 41 to select the output from the sensor pattern Sg. At the same time, using the reset signal generator circuit 69, the main control unit 51 selects the outputs from the sensor patterns Sa and Sb and produces the integrator reset signal. Moreover, using the conversion start signal generator circuit 70, the main control unit 51 selects the output from the sensor pattern Sh and produces the conversion start signal.

With these settings, the main control unit 51 takes in the output from the sensor pattern Sg when the first light beam has passed over the sensor pattern Sg. The main control unit 51 stores the taken-in output in the memory 52 as the light amount of the first light beam (ST121).

Then, the main control unit 51 sends to the select circuit 41 the select signal for selecting the differential amplifier 60. Thus, the differential output representing the difference in output between the sensor patterns Sp and So is sent to the integrator 42. On the other hand, upon receiving the sensor select signal from the main control unit 51, the reset signal generator circuit 69 selects the outputs from the sensor patterns Sa and Sl and produces the reset signal. Moreover, upon receiving the sensor select signal from the main control unit 51, the conversion start signal generator circuit 70 selects the output of the sensor pattern Sq and produces the conversion start signal.

With these settings, the main control unit 51 detects the beam passage position of the first light beam over the sensor patterns Sp and So, and stores it in the memory 52 (ST122).

Subsequently, a movable light beam is emitted with a predetermined power (ST121). For example, the main control unit 51 sends a predetermined instruction value to the second laser driver 32*b* and causes the second laser 31*b* to emit light with a predetermined power.

The galvanomirror 33*b* for the second light beam is actuated so that the movable light beam (second light beam) may pass over the sensor pattern Sg. Thus, the beam passage position of the second light beam is adjusted (ST124).

In order to measure the light amount of the second light beam, the main control unit 51 causes the select circuit 41 to select the output from the sensor pattern Sg. Thus, the light amount of the second light beam is measured and stored in the memory 52 (ST125).

Next, the movable second light beam is controlled to fall at the center of the gap between the sensor patterns Sk and Sj (ST126). The operation in this step is the same as that in step ST105 in FIG. 10.

The operation in the following step ST127, too, is the same as that in step ST106 in FIG. 10.

The second light beam is then controlled to pass over the center of the gap between the sensor patterns Sj and Si (ST128). The operation in this step is the same as that in step ST107 in FIG. 10.

The operation in the following step ST129 is the same as that in step ST108 in FIG. 10.

Then, the main control unit 51 calculates a difference between the value POkj stored in the memory 52 in step ST127 and the value POji stored in the memory 52 in step ST129 (ST130). The operation in this step is the same as that in step ST109 in FIG. 10.

Subsequently, the main control unit 51 calculates a correction coefficient $\alpha$. The correction coefficient $\alpha$ is a ratio of the light amount of the first light beam measured in step ST121 to the light amount of the second light beam measured in step ST125. For example, when the light amount of the first light beam is P1 and the light amount of the second light beam is P2, $\alpha = P1/P2$. The obtained correction coefficient $\alpha$ is multiplied by the value found in step ST130. Thereby, the value obtained in step ST130 is corrected (ST131).

Specifically, where the light amount of the second light beam is greater than that of the first light beam, the value (POkj−POji) of the second light beam becomes greater than the value (POkj−POji) measured when the power of the second light beam is equal to that of the first light beam. Accordingly, where the light beam passage position control is executed by directly using the value obtained in step ST130, the pitch of the light beams becomes greater than a desired value. Inversely, where the light amount of the second light beam is less than that of the first light beam, the pitch of the light beams becomes less than a desired value.

To solve this problem, in step ST131, the main control unit 51 calculates the ratio in light amount of light beams and, using this ratio, corrects the value (POkj−POji).

Figure 10:
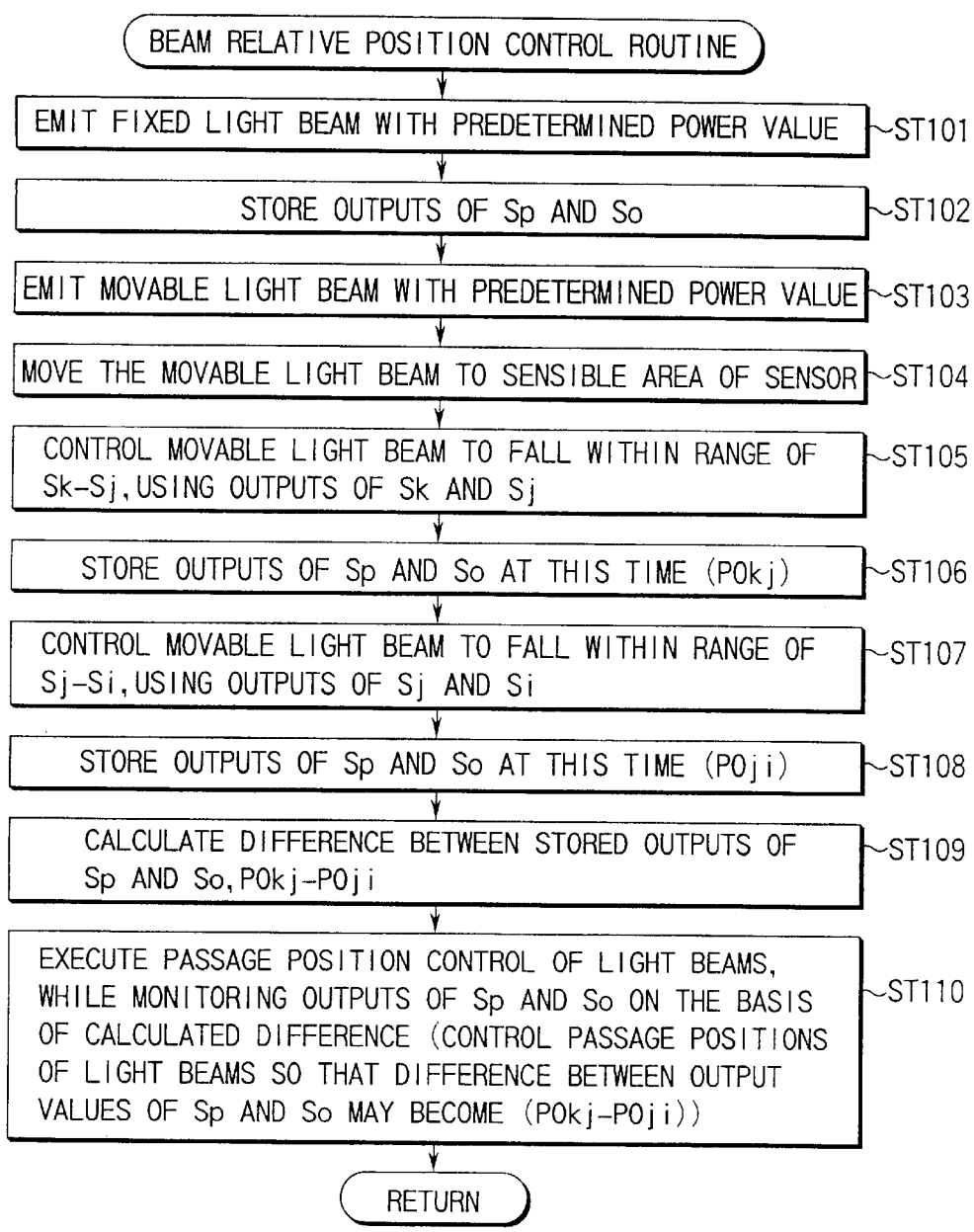
FIG. 10 is a flow chart illustrating a light beam relative position control of a multi-beam optical system according to the third embodiment.

The operation in step ST132 is substantially the same as that in step ST110 in FIG. 10. The sole difference is the use of the value corrected in step ST131.

A sixth embodiment of the present invention will now be described.

The sixth embodiment is characterized in that the correction coefficient a is fed back not to the output (POkj−POji) of the sensor pattern, but to the light amount of the light beam.

Specifically, the main control unit 51 calculates a ratio of the light amount of the fixed light beam (first light beam) to that of the movable second light beam. For example, where the light amount of the second light beam is greater than that of the first light beam, the second light beam is emitted with a light amount multiplied by $\alpha$, and the control illustrated in FIG. 10 is executed. On the other hand, where the light amount of the second light beam is less than that of the first light beam, the second light beam is emitted with a light amount multiplied by $1/\alpha$, and the control illustrated in FIG. 10 is executed.

With this technique, too, the same operational effect as in the fifth embodiment can be obtained.

A seventh embodiment of the invention will now be described.

In the seventh embodiment, the sensor patterns S2 and S3 of the light beam sensor 38 are used not only for the above-described light beam passage position detection, but also for the detection of the light amount of the light beam.

Figure 15:
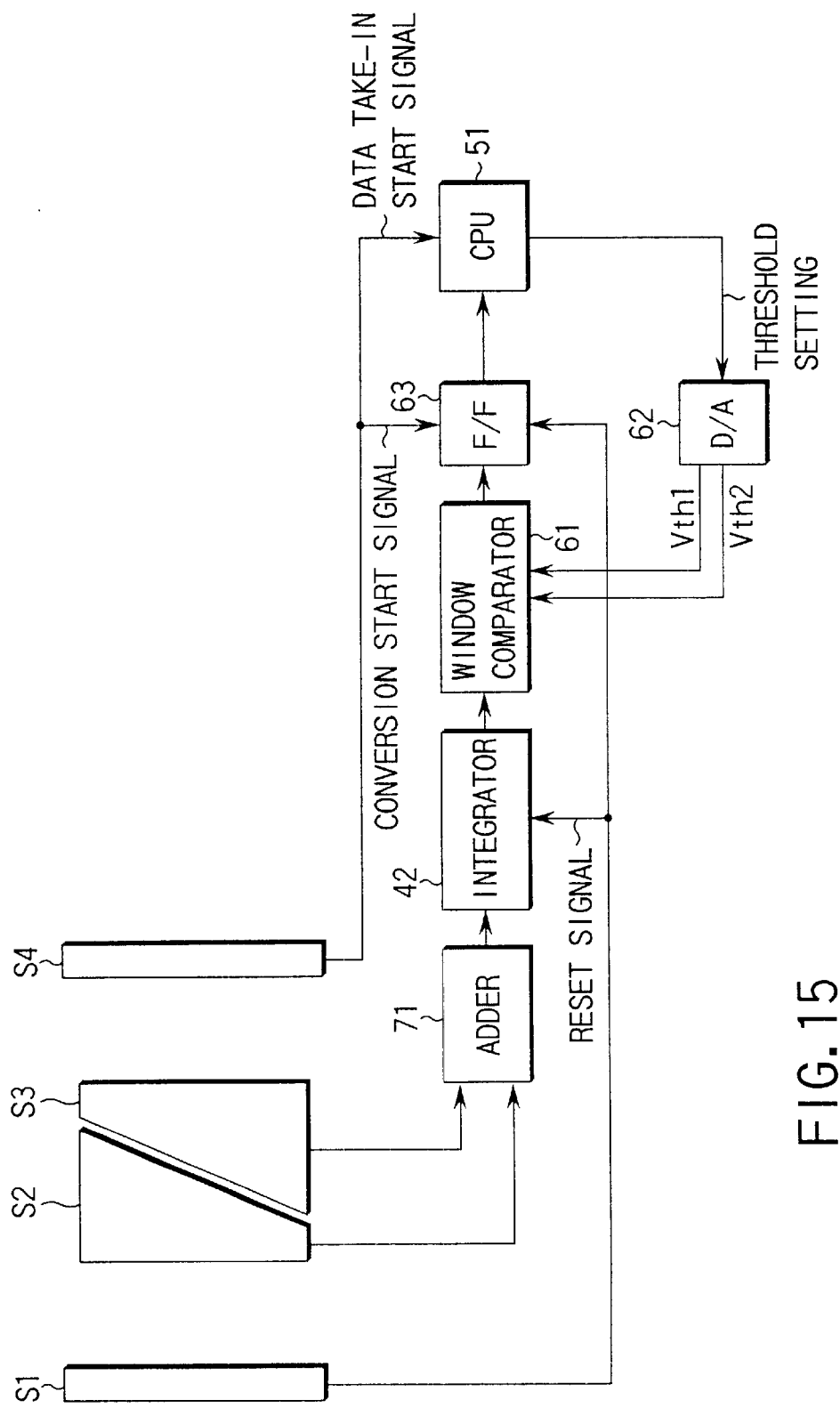
FIG. 15 is a block diagram showing structures of a light beam sensor according to a seventh embodiment of the invention and a light amount sensor portion of an output process circuit for processing an output from the light beam sensor.

FIG. 15 shows the structures of the light beam sensor 38 used in the seventh embodiment and a light amount sensor portion of the output process circuit 40. These structures are basically the same as those shown in FIGS. 4 and 5A. The sole difference is that the output signals from the sensor patterns S2 and S3 are added by an adder 71 and the added signal is input to the integrator 42.

In the above structures, when the light beam passes over the sensor pattern S1, the sensor pattern S1 outputs a current and the current is converted to a voltage value by a current/voltage conversion amplifier (not shown). The converted voltage (analog signal) is digitized by a digitizing circuit (not shown). The digitized signal is input as the reset signal to the integrator 42 and flip-flop circuit 63. By this reset signal, the integrator 42 is reset and the flip-flop circuit 63 is cleared.

Subsequently, when the light beam passes over the sensor patterns S2 and S3, the sensor patterns S2 and S3 output currents. The output currents from the sensor pattern S2 and S3 are converted to voltage values by current/voltage conversion amplifiers (not shown) and the converted voltage values are added by the adder 71.

An output signal from the adder 71 is delivered to the integrator 42 and integrated. An output signal from the integrator 42 is input to the window comparator 61 and digitized. An output signal of the window comparator 61 is held in the flip-flop 63 at the timing of a front edge of the output signal from the sensor pattern S4. At the timing of a rear edge of the digitized output signal from the sensor pattern S4, the main control unit 51 takes in the output signal from the flip-flop circuit 63.

The sensor patterns S2 and S3 have substantially the same shape. The sensor patterns S2 and S3 are symmetrically disposed with a predetermined interval. As has already been described with reference to FIG. 7, the sum of the distance over which the light beam passes over the sensor pattern S2 and the distance over which the light beam passes over the sensor pattern S3 is substantially constant, irrespective of the beam passage position of the light beam. If the output signals from the sensor patterns S2 and S3 are simply added, it can be assumed that one rectangular sensor pattern is formed by the sensor patterns S2 and S3. In other words, the sensor patterns S2 and S3 have a function equal to the function of the sensor pattern Sg for light amount detection as shown in FIG. 12.

Figure 16:
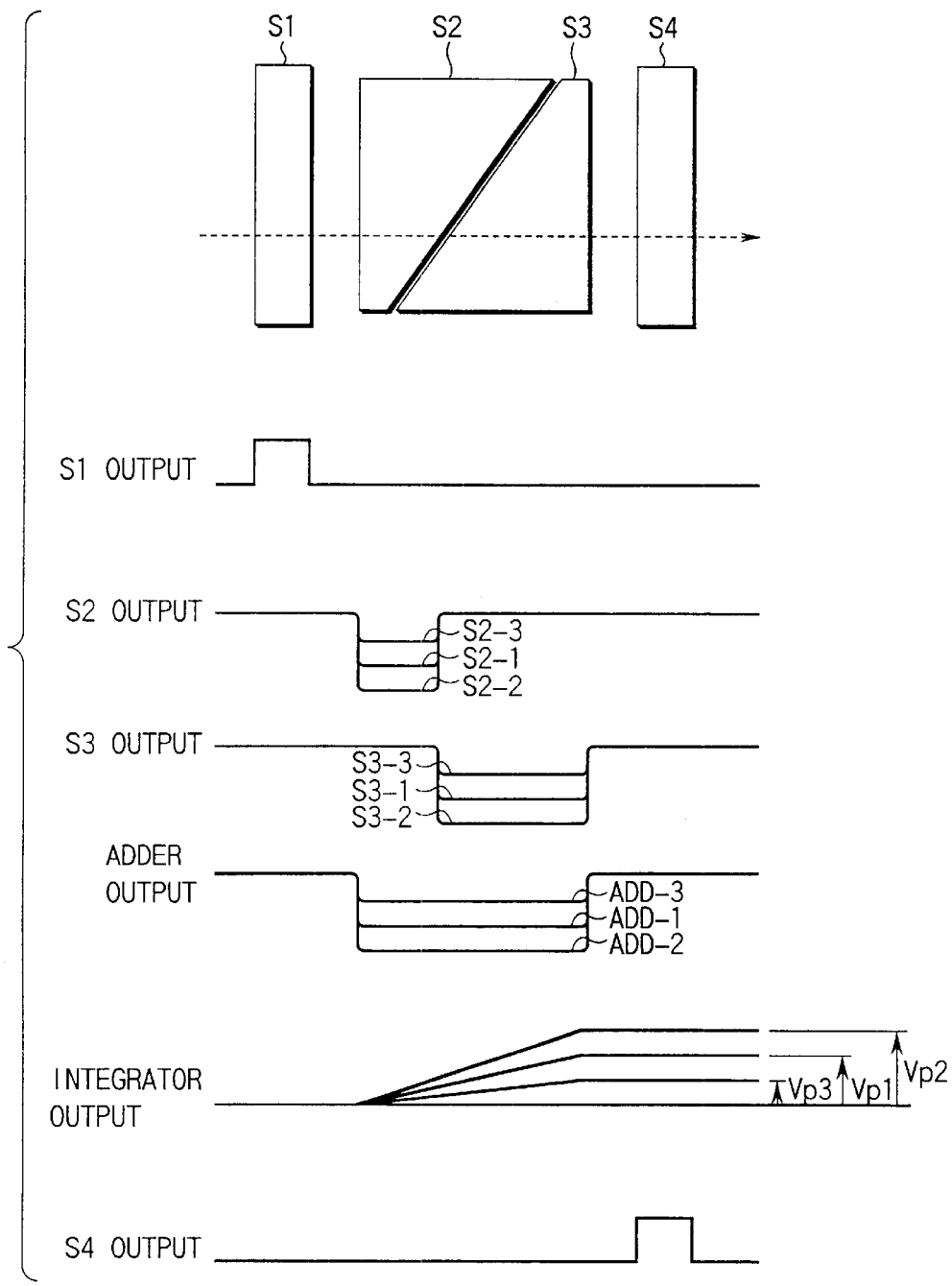
FIG. 16 shows output signals at main portions of sensor patterns, which are obtained when light beams pass over the sensor patterns.

FIG. 16 shows output signals from the sensors S1 to S4, which are produced when the light beam passes over these sensors.

Where the light beam with a light amount of POW1 passes over a position indicated by a broken line in FIG. 16, the output signals from the sensor patterns S2 and S3 are S2-1 and S3-1, respectively. At this time, the output from the adder 71 is ADD-1. If the output ADD-1 is integrated by the integrator 42, an integration output Vp1 is obtained.

Where the light beam with a light amount of POW2 which is equal to double the light amount POW1 (POW2=POW1×2) passes over the position indicated by the broken line in FIG. 16, the output signals from the sensor patterns S2 and S3 are S2-2 and S3-2, respectively. Since the sensor patterns S2 and S3 are formed of photodiodes, these sensors output signals proportional to the radiation light amount.

Specifically, the amplitudes of the output signals S2-2 and S3-2 are nearly double the amplitudes of the output signals S2-1 and S3-1. At this time, the output from the adder 71 is ADD-2. If the output ADD-2 is integrated by the integrator 42, an integration output Vp2 is obtained (Vp2=Vp1×2).

Where the light beam with a light amount of POW3 which is equal to half the light amount POW1 (POW3=POW1×½) passes over the position indicated by the broken line in FIG. 16, the output signals from the sensor patterns S2 and S3 are S2-3 and S3-3, respectively. Since the sensor patterns S2 and S3 output signals proportional to the radiation light amount, the amplitudes of the output signals S2-3 and S3-3 are nearly half the amplitudes of the output signals S2-1 and S3-1.

At this time, the output from the adder 71 is ADD-3. If the output ADD-3 is integrated by the integrator 42, an integration output Vp3 is obtained (Vp3=Vp1×½).

In this manner, by adding the output signals from the sensor patterns S2 and S3, the light amount of the light beam passing over the sensor patterns S2 and S3 can be detected.

An eighth embodiment of the invention will now be described.

The eighth embodiment relates to a circuit structure for detecting the light amount of the light beam using the sensor patterns Sp and So of the light beam sensor 38.

Figure 17:
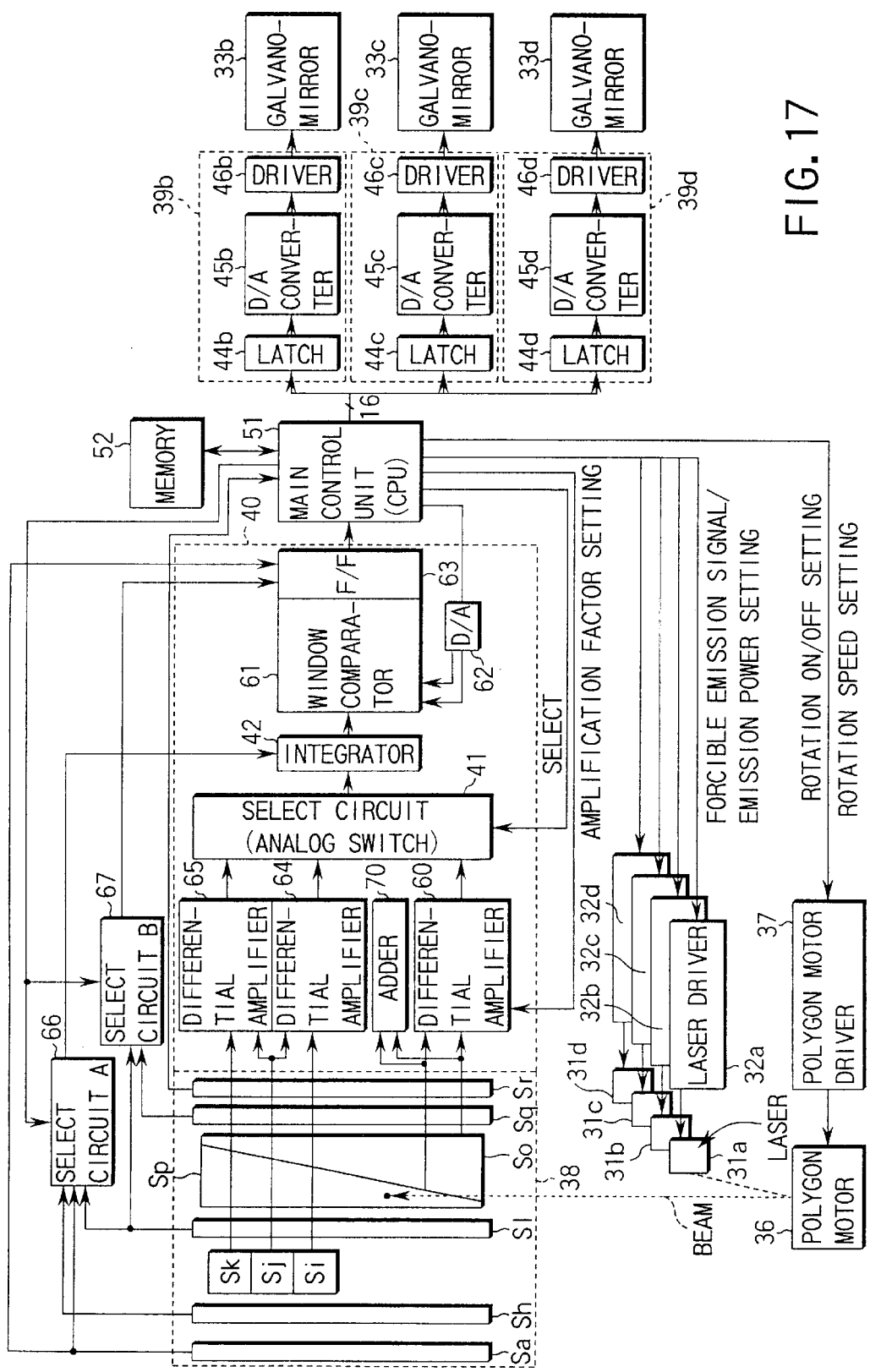
FIG. 17 is a block diagram showing the structures of a light beam sensor output process circuit according to an eighth embodiment of the invention and its peripheral sections.

FIG. 17 shows the structures of the beam sensor output process circuit 40 used in the eighth embodiment and its peripheral sections. These structures are basically the same as those shown in FIGS. 9 and 13. The sole difference is that the output signals from the sensor patterns Sp and So are added by the adder 71 and the added signal is input to the select circuit 41. In the light amount detection mode, the main control unit 51 selects the output from the adder 71 using the select circuit 41, and delivers the selected output to the integrator 42. The operation for the light amount detection is the same as that in the seventh embodiment, and a description thereof is omitted.

A ninth embodiment of the invention will now be described.

The ninth embodiment relates to monitoring of the fixed light beam passage position, which can facilitate the adjustment and control of the light beam passage position.

In the case of the fixed light beam, for which there is provided no actuator for moving it in a direction perpendicular to the scan direction, the fixed light beam is not newly adjusted except the initial adjustment at the time of shipment. However, the beam passage position of the fixed light beam gradually deviates from the initial adjustment position due to temperatures, vibration or variation of parts due to the passing of time.

In the relative position control of the beam passage position as described in the first to eighth embodiments, in order to solve the above problem, the actuators are provided for the light beams except the fixed light beam, and the desired pitch is maintained relative to the fixed light beam which will move over a long time period.

In many cases, however, the output of the photodiode is not linear at the edge portion of the light beam relative position sensor (sensor pattern Sp, So). In addition, the edge portions of the sensor patterns Sp and So have non-sensible areas where the variation in the beam passage position cannot be sensed, because of offset voltages of operational amplifiers in the beam sensor output process circuit 40. In a word, it is not possible that the entire areas of the sensor patterns Sp and So can sense the beam passage position.

Consequently, where the beam passage position of the fixed light beam has deviated to the non-sensible area due to a variation with the passing of time, the beam passage position control cannot be executed and the pitch of the light beams cannot be controlled at a desired value.

Figure 22:
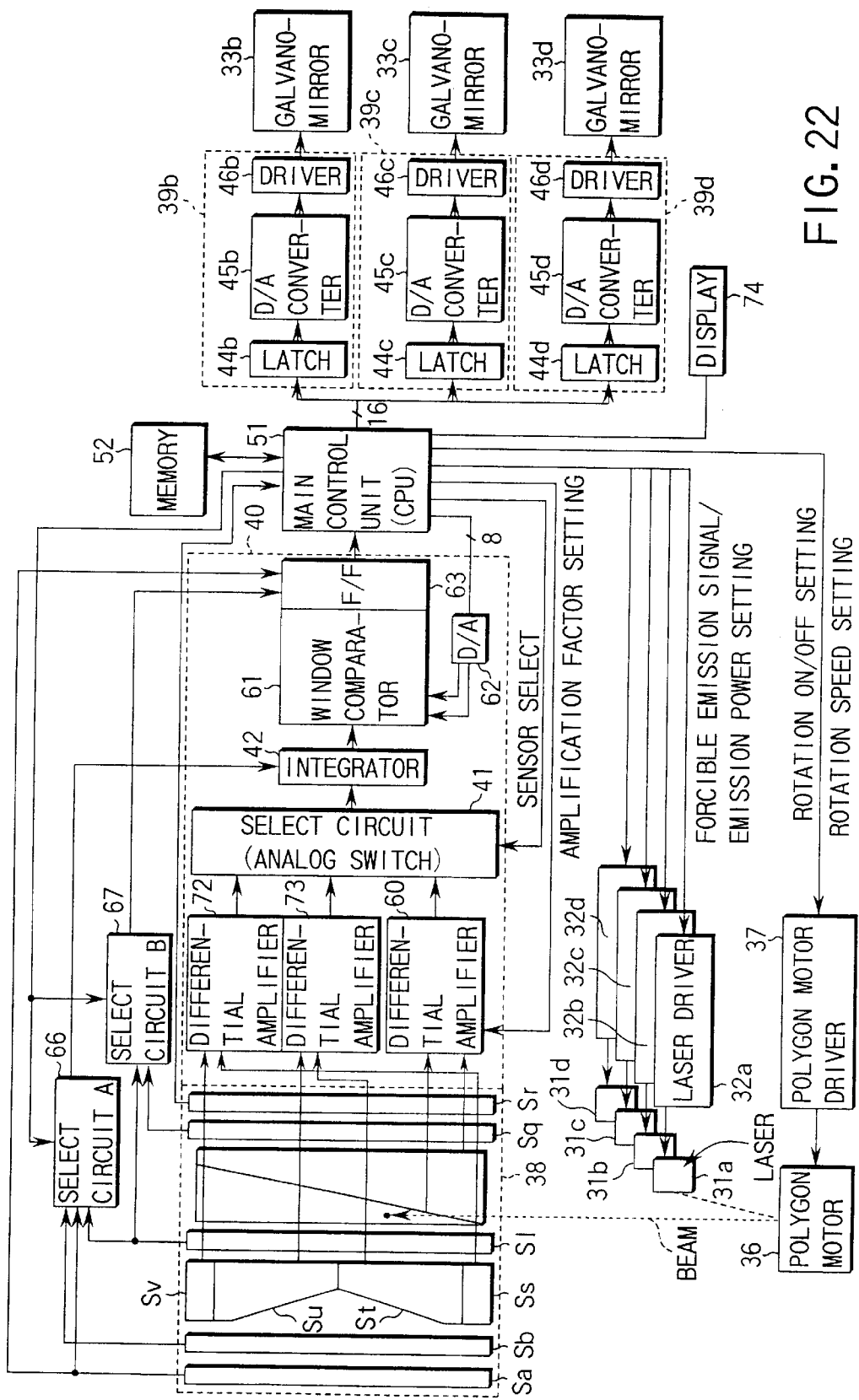
FIG. 22 is a block diagram showing the structures of a light beam sensor output process circuit and its peripheral sections in a multi-beam optical system in the case of using the light beam sensor shown in FIG. 19.

Thus, in the ninth embodiment, sensors for monitoring the beam passage position of the fixed light beam is provided. If the passage position of the fixed light beam approaches the non-sensible area of the beam relative position sensor (sensor pattern Sp, So), this state is detected and displayed on a display 74, as shown in FIG. 22, to issue an alarm and prompt a serviceman call. If the passage position of the fixed light beam has entered the non-sensible area, the operation of the apparatus is halted.

Figure 18:
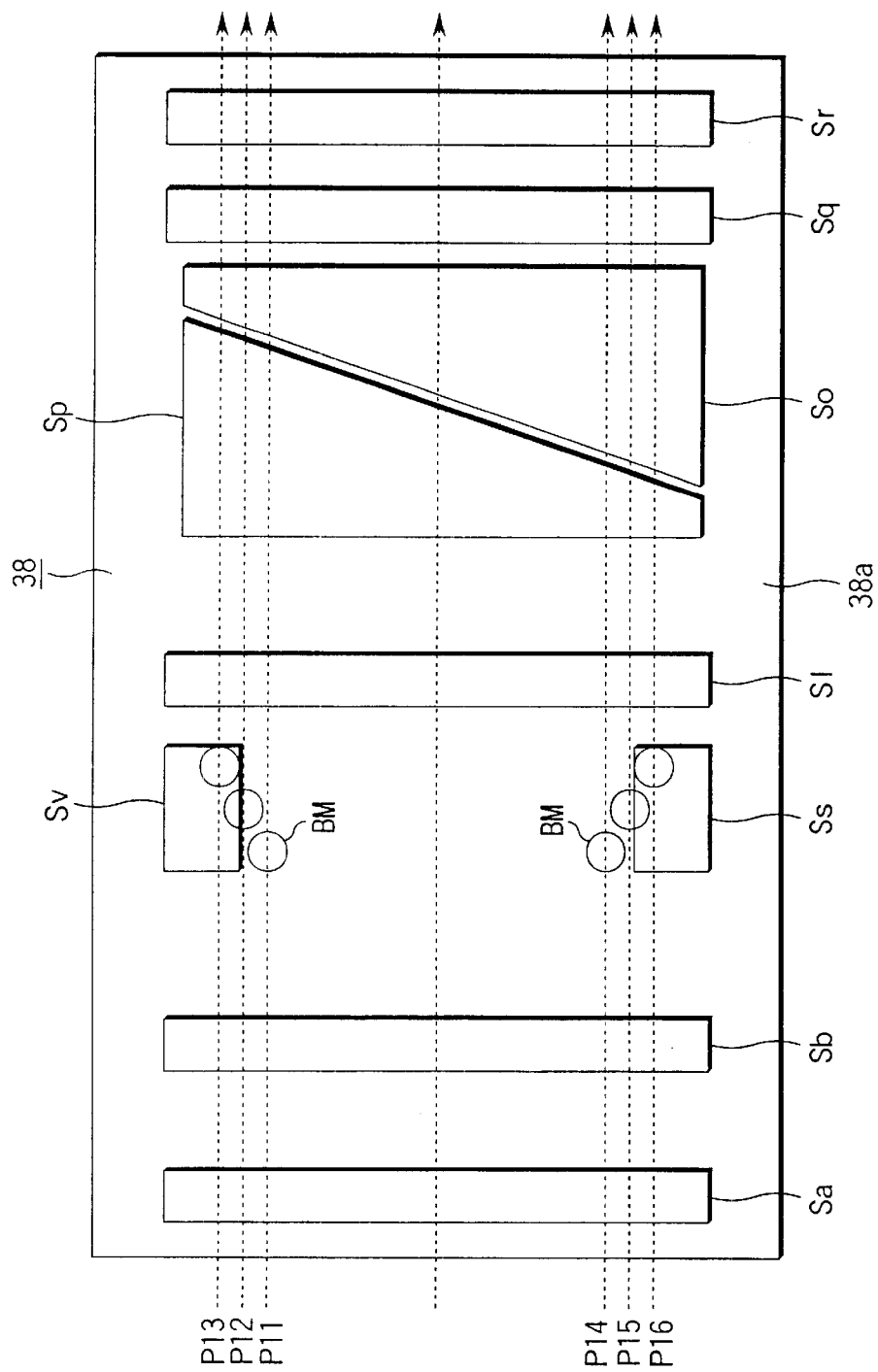
FIG. 18 schematically shows a structure of a light beam sensor according to a ninth embodiment of the invention.

FIG. 18 shows the structure of the light beam sensor 38 used in the ninth embodiment. The structure of this light beam sensor 38 is basically the same as those of the light beam sensors 38 shown in FIGS. 8 and 11. The difference is that sensor patterns Ss and Sv are provided. The sensor patterns Ss and Sv are patterns for sensing the fixed light beam. The sensor patterns Ss and Sv are disposed relatively outward in the sub-scan direction, compared to the sensor patterns Sp and So for sensing the light beam relative position. The reason is that the sensor patterns Ss and Sv need to cover sensible areas outside the sensor patterns Sp and So.

The sensor patterns Ss and Sv, like the other sensor patterns, are composed of photodiodes, or photodetector elements. The sensor patterns Ss and Sv output electric current proportional to the radiation light amount.

Broken lines P11 to P16 in FIG. 18 indicate beam passage positions of the fixed light beam BM. The broken lines P11 to P16 have the following meanings:

P11 to P14: sensible area of sensor patterns Sp and So,

P12, P15: a boundary between a sensible area and a non-sensible area, and

P13 or above, and P16 or below: non-sensible areas.

Where the passage position of the fixed light beam is P12 or P15, the sensor pattern Sv associated with P12 outputs a signal, and the sensor pattern Ss associated with the latter outputs a signal. Thus, the position of the light beam can be detected. Where the fixed light beam has passed over P12 or P15, the main control unit 51 causes the display or the like on the control panel 53 to display an alarm.

Where the passage position of the fixed light beam is P13 or P16, the main control unit 51 causes the display or the like on the control panel 53 to display that the beam passage position is on the non-sensible area (a control-disabled state) and halts the operation of the apparatus. In this case, the output from the sensor pattern Sv or Ss is greater than in the case where the beam passage position is P12 or P15. Accordingly, the main control unit 51 can detect that the light beam is passing over P13 or P16.

Figure 19:
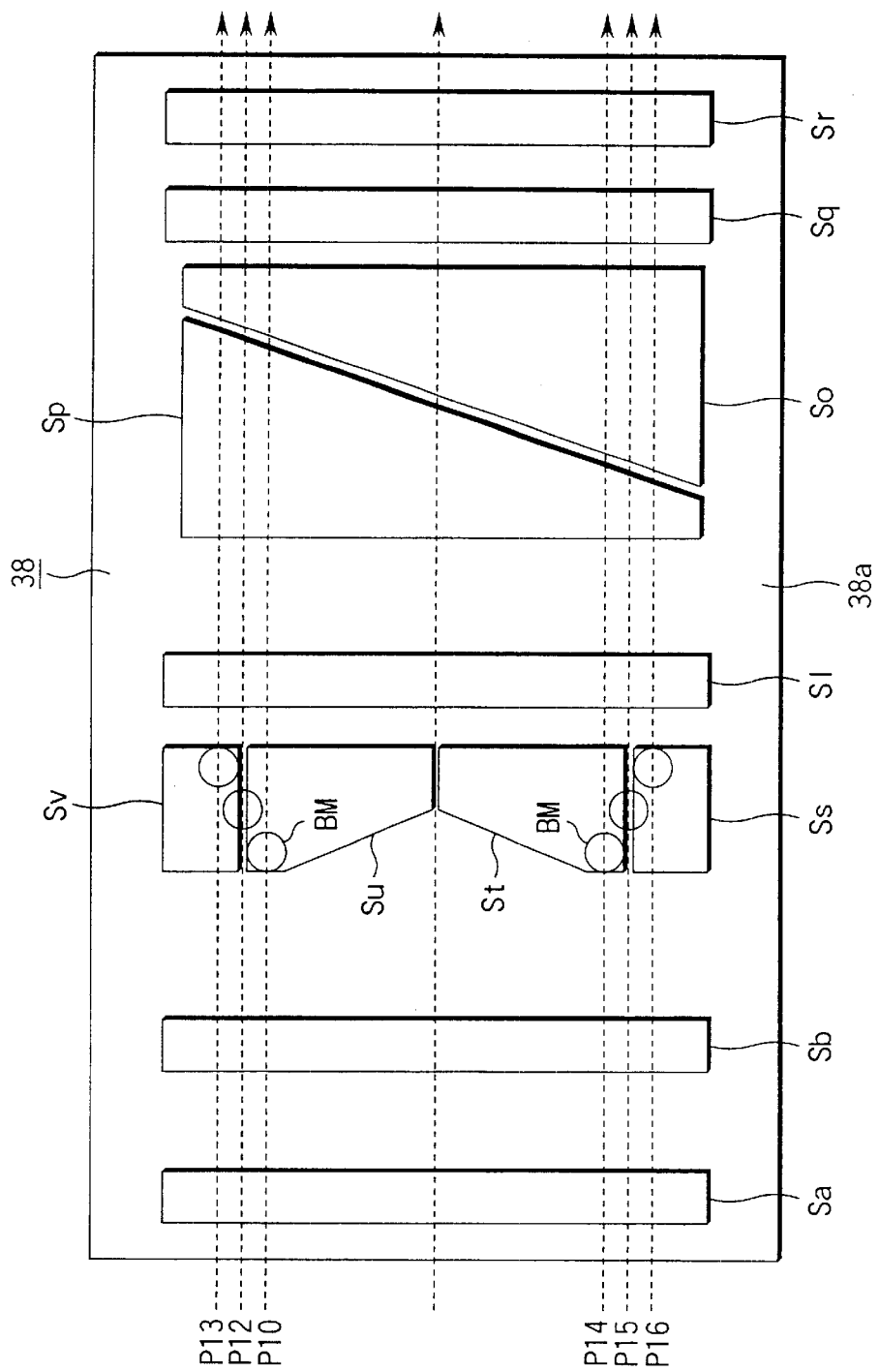
FIG. 19 schematically shows a structure of a light beam sensor according to a modification of the ninth embodiment the invention.

FIG. 19 shows a modification of the ninth embodiment. The light beam sensor 38 of this modification differs from that shown in FIG. 18 in that sensor patterns St and Su are further provided between the sensor patterns Ss and Sv. In this modification, even where the fixed light beam is passing over the area between the sensor patterns Ss and Sv, the beam passage position can be monitored.

Figure 20:
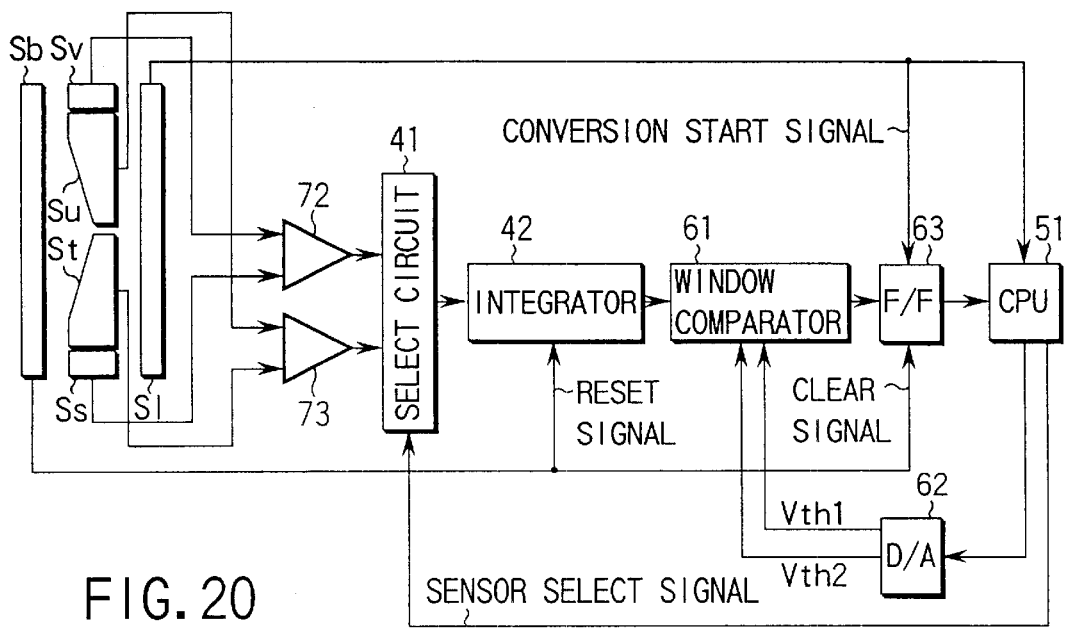
FIG. 20 is a block diagram showing a light beam monitor portion of a light beam sensor output process circuit in a single beam optical system in the case of using the light beam sensor shown in FIG. 19.

FIG. 20 shows the structure of the beam monitor portion of the beam sensor output process circuit 40 in the single-beam optical system using the light beam sensor 38 shown in FIG. 19. Output signals from the sensor patterns Ss and Sv are input to a differential amplifier 72, and a differential output from the differential amplifier 72 is input to the select circuit 41. Output signals from the sensor patterns St and Su are input to a differential amplifier 73, and a differential output from the differential amplifier 73 is input to the select circuit 41. In accordance with a select signal from the main control unit 51, the select circuit 41 selects one of the output signals from the differential amplifiers 72 and 73 and delivers the selected output signal to the integrator 42. The other structural features are the same as those in FIG. 5A or FIG. 15.

With this structure, if the light beam passes over the sensor pattern Sb, the sensor pattern Sb outputs an electric current, and the electric current is converted to a voltage signal by a current/voltage conversion amplifier (not shown). The converted voltage signal is digitized by a digitizing circuit (not shown). The digitized signal is input as the reset signal to the integrator 42 and flip-flop circuit 63. By this reset signal, the integrator 42 is reset and the flip-flop circuit 63 is cleared.

Subsequently, if the light beam passes over the region extending from the sensor pattern Ss to the sensor pattern Sv, the sensor pattern over which the light beam has passed outputs a current. The output current from the sensor pattern Ss, Sv is converted to a voltage signal by a current/voltage conversion amplifier (not shown). The converted voltage signal is input to the differential amplifier 72. An output from the differential amplifier 72 is input to the integrator 42 via the select circuit 41 and integrated. An output signal from the integrator 42 is input to the window comparator 61 and digitized.

On the other hand, an output current from the sensor pattern ST, Su is converted to a voltage signal by a current/ voltage conversion amplifier (not shown). The converted voltage signal is input to the differential amplifier 73. An output from the differential amplifier 73 is input to the integrator 42 via the select circuit 41 and integrated. An output signal from the integrator 42 is input to the window comparator 61 and digitized.

An output signal of the window comparator 61 is held in the flip-flop 63 at the timing of a front edge of the output signal from the sensor pattern S1. At the timing of a rear edge of the output signal from the sensor pattern S1, the main control unit 51 takes in the output signal from the flip-flop circuit 63.

Figure 21:
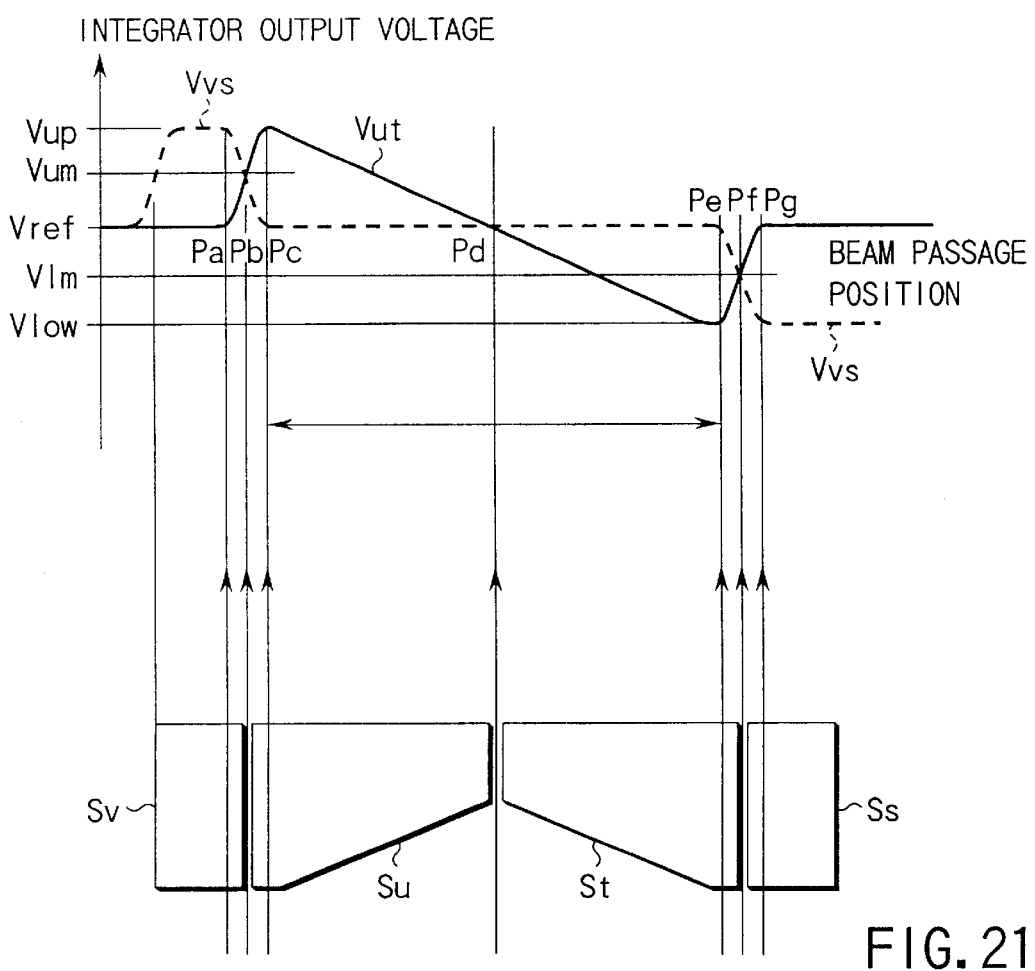
FIG. 21 is a graph showing a relationship between a light beam passage position on a stationary light beam passage position sensor and an integration output.

FIG. 21 shows a relationship between the beam passage position on the fixed beam passage position sensor (sensor patterns Ss to Sv) and the integration output. An integration value Vvs of the differential output signal associated with the sensor patterns Sv and Ss is indicated by a broken line, and an integration value Vut of the differential output signal associated with the sensor patterns Su and St is indicated by a solid line. Symbols Pa to Pg indicating the beam passage positions in FIG. 21 have the following meanings:

Pa, Pg: a non-sensible area,
Pb, Pf: a boundary between a sensible area and a non-sensible area,
Pc, Pe: a sensible area of the sensor pattern Sp, So, and
Pd: a center of the sensor pattern Sp, So.

When the passage position of the fixed light beam is monitored, the main control unit 51 selects the output of the differential amplifier 73 using the select circuit 41, delivers it to the integrator 42, and reads in the output of the integrator 42. If the read-in value Vut is near Vref, the passage position of the fixed light beam is near Pd (center) or on the non-sensible area. Further, the main control unit 51 selects the output of the differential amplifier 72 using the select circuit 41, delivers it to the integrator 42, and reads in the output of the integrator 42. If the read-in value Vvs is Vup or Vlow, the passage position of the fixed light beam is on the non-sensible area. If the read-in value Vvs is near Vref, the beam passage position is near Pd (center).

On the other hand, if the integration value Vut of the output of the differential amplifier 73 (the differential output associated with the sensor patterns St and Su) is near Vup, the passage position of the fixed light beam is Pc (sensible area) or Pb (boundary area). The main control unit 51 selects the output of the differential amplifier 72 using the select circuit 41, delivers it to the integrator 42, and reads in the output of the integrator 42. If the read-in value Vvs is near Vum, the passage position of the fixed light beam is Pb (boundary area). If the read-in value Vvs is near Vref, the passage position of the fixed light beam is Pc (sensible area).

Similarly, if the integration value Vut of the output of the differential amplifier 73 (the differential output associated with the sensor patterns St and Su) is near Vlow, the passage position of the fixed light beam is Pe (sensible area) or Pf (boundary area). The main control unit 51 selects the output of the differential amplifier 72 using the select circuit 41, delivers it to the integrator 42, and reads in the output of the integrator 42. If the read-in value Vvs is near Vlm, the passage position of the fixed light beam is Pf (boundary area). If the read-in value Vvs is near Vref, the passage position of the fixed light beam is Pe (sensible area).

If the integration value Vut of the output of the differential amplifier 73 takes other values, the beam passage position is on the sensible area.

FIG. 22 shows the structures of the beam sensor output process circuit 40 and its peripheral sections in the multi-beam optical system using the light beam sensor shown in FIG. 19. These structures are similar to those in FIG. 9 or FIG. 20, and a description thereof is omitted.

A tenth embodiment of the invention will now be described.

The tenth embodiment relates to offset detection and control in the beam sensor output process circuit 40.

Figure 23:
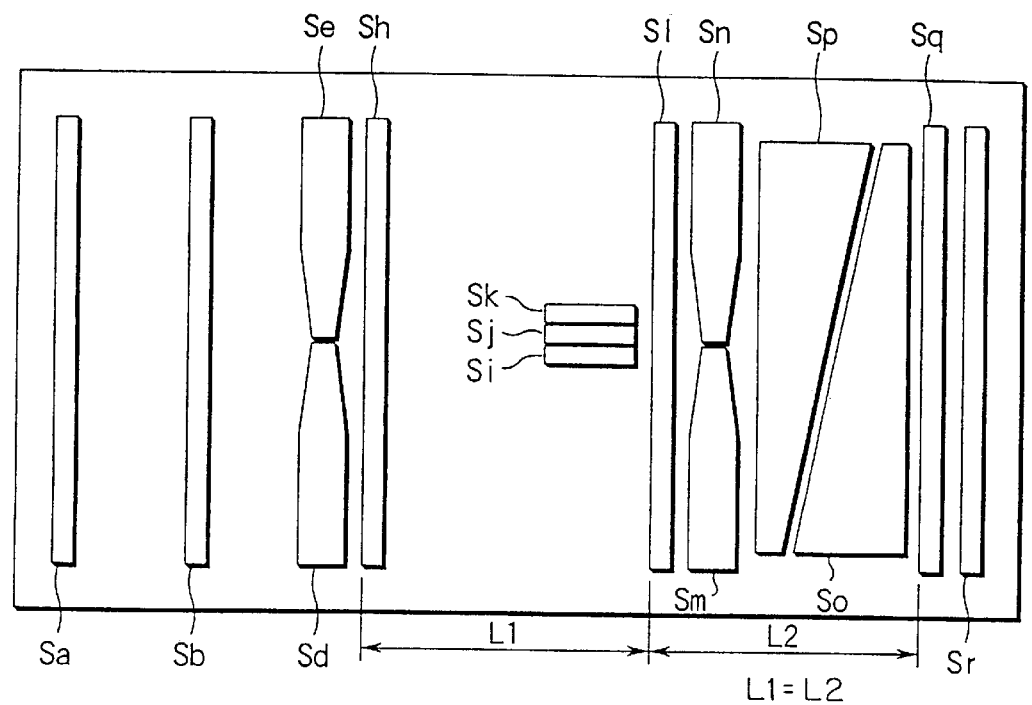
FIG. 23 schematically shows an example of the structure of conventional light beam sensor.

Table 1 below shows sensor patterns used in a beam passage position detection mode and an offset detection mode in a system using a light beam sensor as shown in FIG. 23.

TABLE 1

| SENSOR PATTERNS TO BE USED | INTERVAL FOR INTEGRATION IN BEAM PASSAGE POSITION DETECTION MODE | INTERVAL FOR INTEGRATION IN OFFSET DETECTION MODE |
| --- | --- | --- |
| S1, Sj, Sk | Sh and Sl | Sl and Sq |
| Sp, So | Sl and Sq | Sh and Sl |

In the conventional light beam sensor, in order to equalize the integration time for the normal beam passage position detection mode and the integration time for the offset detection mode, the sensor patterns Sh, Sl and Sq for generating the timing for integration time are disposed at equal intervals L1 and L2, as shown in FIG. 23. The details of the offset detection and control are described, for example, in Jpn. Pat. Appln. KOKAI Publication No. 10-142535 (Jpn. Pat. Application No. 8-305006).

With recent development in the copying operation speed, however, the beam scan speed is increased and no sufficient space can be provided for the arrangement of sensor patterns on the light beam sensor. Consequently, the intervals L1 and L2 cannot be equalized. Moreover, with the increase in the number of functions of the light beam sensor, the number of sensor patterns increases and the intervals L1 and L2 cannot be made equal.

In the tenth embodiment, there is no need to equalize the integration time for the beam passage position detection mode and the integration time for the offset detection mode. In other words, there is no need to equalize the intervals L1 and L2 among the sensor patterns Sh, Sl and Sq for generating the timing for the integration time.

Figure 24:
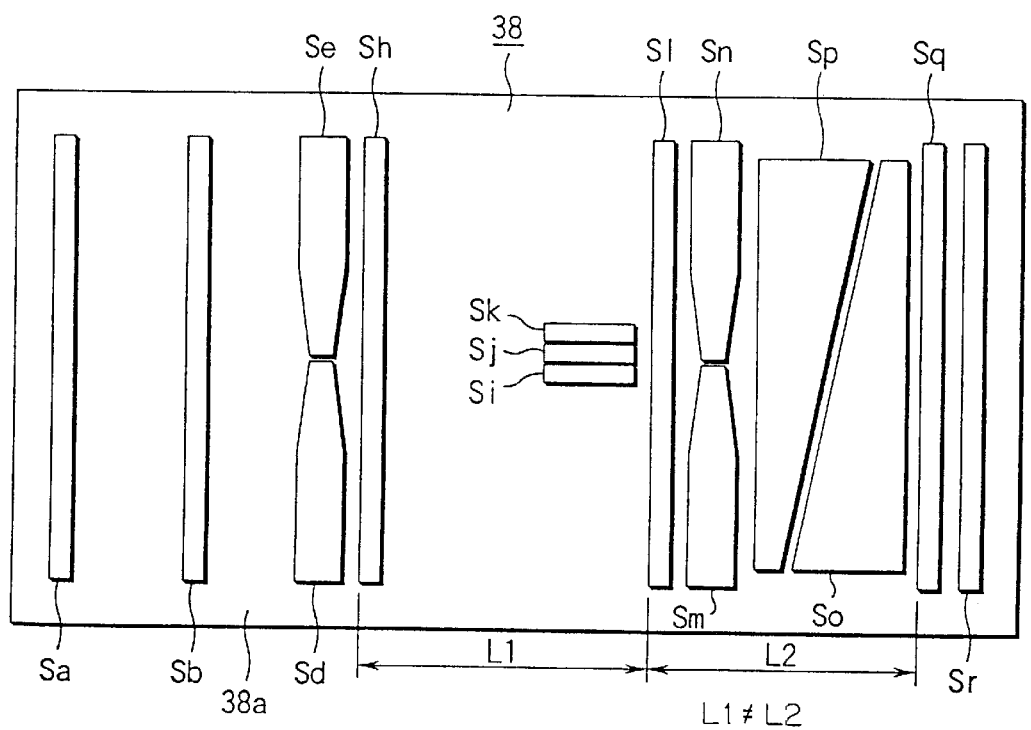
FIG. 24 schematically shows a structure of a light beam sensor according to a tenth embodiment of the invention.

FIG. 24 shows the structure of a light beam sensor 38 used in the tenth embodiment. This structure is basically the same as that shown in FIG. 8 or FIG. 11. However, the intervals L1 and L2 among the sensor patterns Sh, Sl and Sq for generating the timing for the beam passage position detection mode and the offset detection mode are not equal (L1<L2 in FIG. 24). In a word, the integration time for the beam passage position detection mode differs from the integration time for the offset detection mode.

Figure 25:
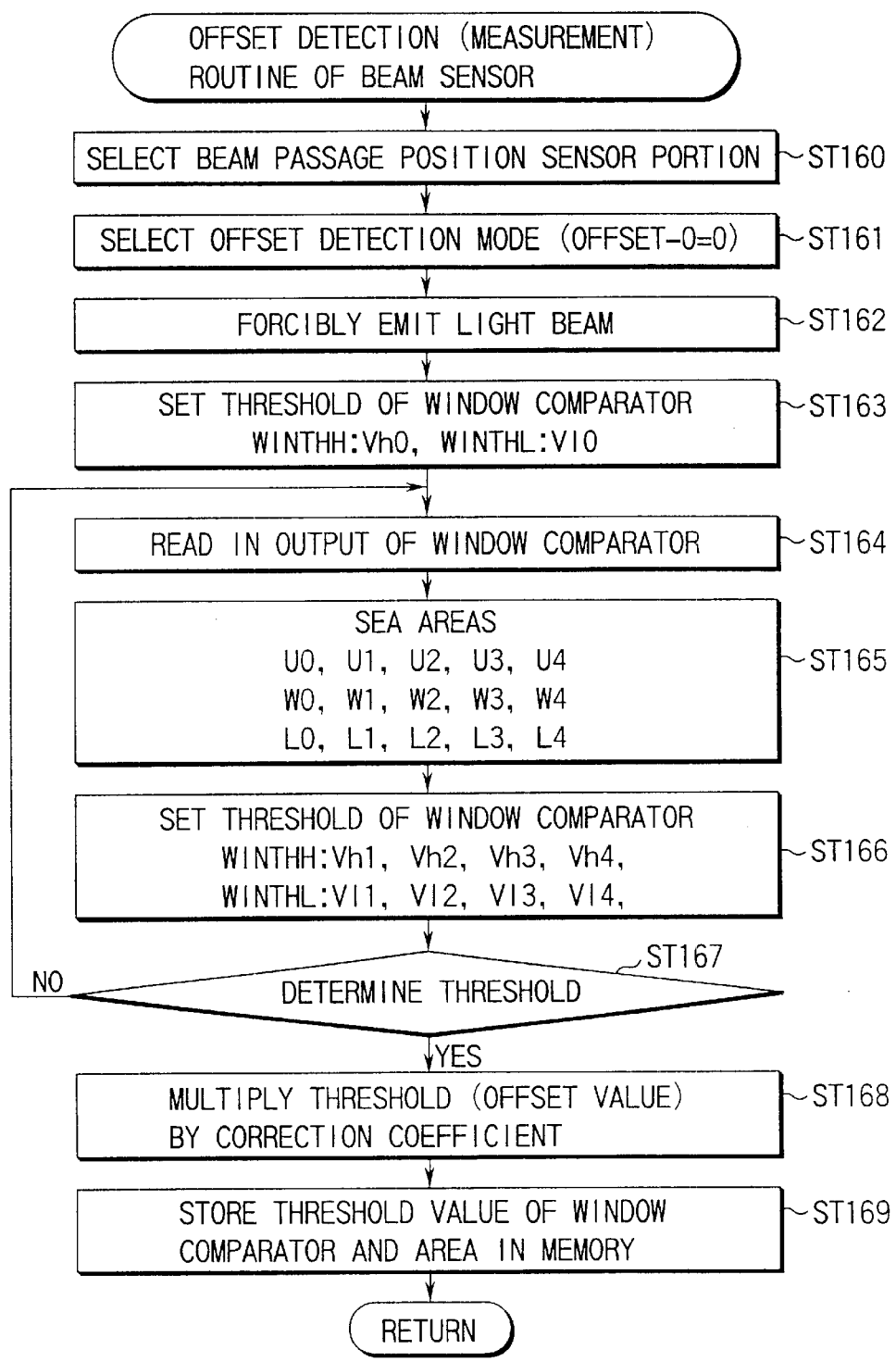
FIG. 25 is a flow chart illustrating a flow of offset detection.

The offset detection according to the tenth embodiment will now be described with reference to a flow chart of FIG. 25, the beam sensor output process circuit shown in FIG. 13, and the light beam sensor according to this embodiment as shown in FIG. 24. In the present embodiment, the sensor patterns used for the offset detection are sensor patterns Sk and Sj (the beam passage position sensor for the first beam a).

To start with, the control section 51 selects the beam passage position sensor portion. Specifically, the control unit 51 sends the select signal to the select circuit 41 (see FIG. 13), thereby to select the differential amplifier 64. The differential output 42 associated with the sensor patterns Sk and Sj is delivered to the integrator 42 (ST160).

Then, the control section 51 selects the offset detection mode. Specifically, the control unit 51 selects the sensor patterns Sa and Sl, and generates the reset signal for the integrator 42. In addition, the output signal from the sensor pattern Sq is selected as the conversion start signal (ST161). In other words, the interval for integration in the offset detection mode is that between the sensor patterns Sl and Sq.

Next, the control unit 51 forcibly emits one light beam and rotates the polygon mirror 35 (ST162).

Subsequently, the control unit 51 executes the operations in steps ST163 to ST167. Thereby, the control unit 51 reads in the offset value of the beam passage position detector portion (current/voltage conversion amplifier, differential amplifier, integrator, etc.). Assume that the read-in offset value is Vosa. In the example illustrated in FIG. 25, the offset value is obtained on the basis of the setting of the threshold of the window comparator. Needless to say, the offset value can similarly be used by using the A/D converter instead of the window comparator.

Since the offset value Vosa is a value obtained at the interval between the sensor patterns Sl and Sq, which is the interval for integration, the absolute value of Vosa is greater than the real offset value (because L1<L2). Thus, by multiplying the offset value Vosa by a correction coefficient $\beta$=L1/L2, the offset value is corrected (ST168). Accordingly, the corrected offset value Va is Va=Vosa×$\beta$=Vosa (L1/L2).

In brief, the difference in the offset value due to the difference in integration time is corrected on the basis of the ratio of the interval of the sensor patterns which define the interval for integration.

Moreover, in order to enhance the precision in the offset detection, it is possible to measure a time (Thl) over which the light beam passes over the interval between the sensor patterns Sh and Sl and a time (Tlq) over which the light beam passes over the interval between the sensor patterns Sl and Sq, and to use the ratio of the former to the latter as a correction coefficient. The correction coefficient $\gamma$ at this time is $\gamma$=Thl/Tlq. The corrected offset value is Va=Vosa× $\gamma$=Vosa×(Thl/Tlq).

Figure 26:
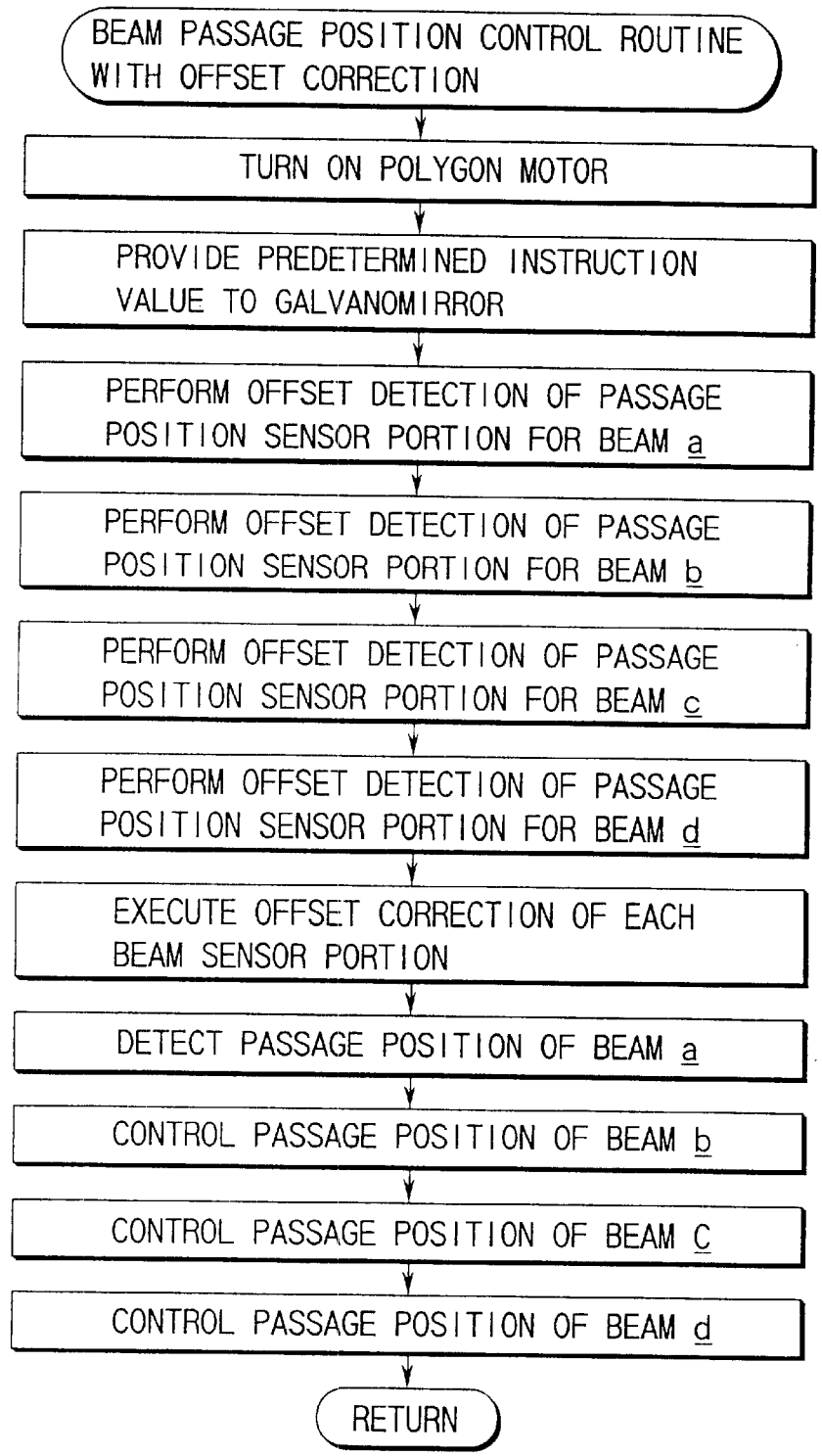
FIG. 26 is a flow chart illustrating a light beam passage position control routine with offset correction.

In the subsequent step, the control unit 51 stores the corrected offset value in the memory 52 (ST169). FIG. 26 shows an example of a control routine for the beam passage position control with offset correction.

Figure 27:
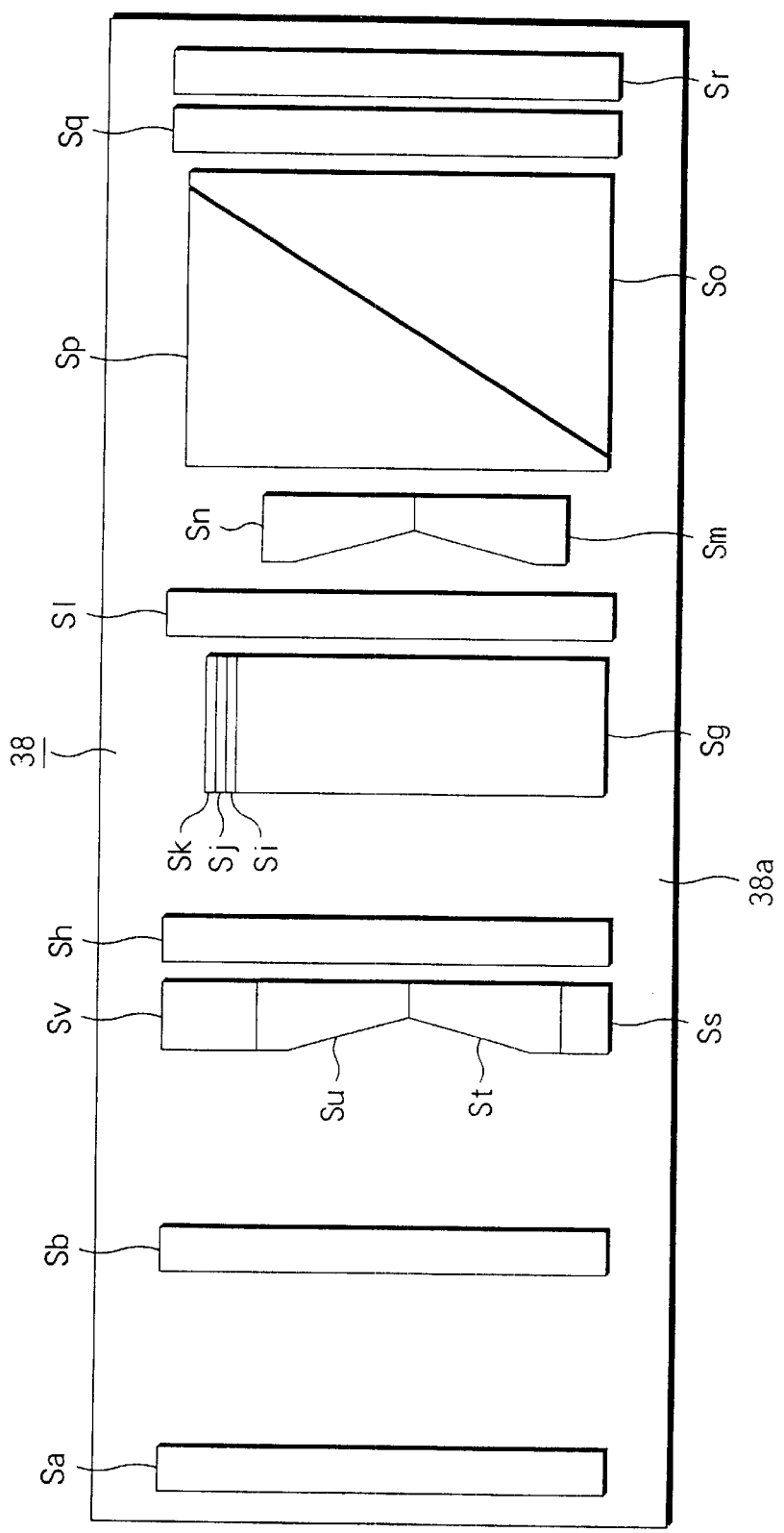
FIG. 27 schematically shows an example of the structure of a single light beam sensor provided with the functions of the optical beam sensors according to the respective embodiments.

FIG. 27 shows an example of the structure of the light beam sensor 38 into which the respective functions of the light beam sensors 38 according to the above-described embodiments are integrated.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light beam scanning apparatus comprising:
    a light beam generating unit which outputs a light beam;
    scanner for reflecting the light beam output from the light beam generating unit toward a surface to be scanned, and scanning the-light beam over the to-be-scanned surface;
    a beam passage position detection unit which includes a pair of photodetector elements disposed at a position equivalent to a position of the to-be-scanned surface with a predetermined interval provided between the paired photodetector elements in a main scan direction of the light beam scanned by the scanner, the paired photodetector elements being constructed such that an output from one of the paired photodetector elements successively increases while an output from the other photodetector element successively decreases in relation to a variation of a passage position of the light-beam in a sub-scan direction perpendicular to the main scan direction, the beam passage position detection unit detecting the passage position in the sub-scan direction of the light beam scanned by the scanner on the basis of a difference between the outputs from the paired photodetector elements; and
    a control unit which controls the passage position of the light beam scanned by the scanner on the to-be-scanned surface to come to a predetermined position, on the basis-of a detection result of the beam passage position detection unit.

2. An apparatus according to claim 1, wherein the apparatus is provided with a plurality of said light beam generating units,
    said scanner reflects a plurality of light beams output from said plurality of light beam generating units toward the to-be-scanned surface, and said plurality of light beams are scanned over the to-be-scanned surface, and
    the apparatus further comprises:
    a first position confirmation unit which is disposed on an area including a first target beam passage position located away from the beam passage position detection unit in the main scan direction, and confirms that the light beam passes over the first target beam passage position;
    a second position confirmation unit which is disposed on an area including a second target beam passage position located away from the first target beam passage position by a predetermined distance in the sub-scan direction, and confirms that the light beam passes over the second target beam passage position; and
    a beam passage position varying unit which varies the passage position of at least one of the plurality of light beams in the sub-scan direction, and
    wherein said control unit includes:
    a calculation unit which calculates a first difference between an output produced from the beam passage position detection unit when the light beam has passed over the first target beam passage position and an output produced from the beam passage position detection unit when the light beam has passed over the second target beam passage position; and
    a varying control unit which varies a passage position of a second light beam of said plurality of light beams by using the beam passage position varying unit such that a second difference between outputs of the beam passage position detection unit for a first light beam and the second light beam of said plurality of light beams may become equal to said first difference.

3. An apparatus according to claim 2, wherein said beam passage position varying unit is capable of varying passage positions of the light beams excluding the first light beam, and the first light beam is a fixed light beam whose position is fixed in the sub-scan direction.

4. An apparatus according to claim 3, further comprising a light amount detection unit which is disposed away from the beam passage position detection unit in the main scan direction, and detects a light amount of the light beam scanned by the scanner,
    wherein said control unit includes a correction unit which finds a ratio of light amounts of the first and second light beams on the basis of an output of the light amount detection unit and corrects, by using the found ratio of light amounts, the first difference obtained when the second light beam passes over the first and second target beam passage positions, and the varying control unit varies the passage position by using the corrected first difference.

5. An apparatus according to claim 4, wherein said light amount detection unit is constructed by using a pair of photodetector elements of the beam passage position detection unit, and the light amount detection unit adds outputs of the photodetector elements when the light beam passes over the photodetector elements and provides an added result as a light amount of the light beam.

6. An apparatus according to claim 2, further comprising:
a light amount detection unit which is disposed away from the beam passage position detection unit in the main scan direction, and detects a light amount of the light beam scanned by the scanner; and
a light amount control unit which finds a ratio of light amounts of the light beams on the basis of an output from the light amount detection unit, and controls the plural light beam generating unit on the basis of the found ratio of light amounts such that the light amount of each of the plural light beams may fall within a predetermined range.

7. An apparatus according to claim 6, wherein said light amount detection unit is constructed by using a pair of photodetector elements of the beam passage position detection unit, and the light amount detection unit adds outputs of the photodetector elements when the light beam passes over the photodetector elements and provides an added result as a light amount of the light beam.

8. An apparatus according to claim 1, further comprising:
a beam monitoring unit which is disposed at a position equivalent to the position of the to-be-scanned surface, and detects the light beam passing over an area outside a light beam sensible area of the beam passage position detection unit; and
a notice unit which issues, when the beam monitoring unit has detected the light beam passing over the area outside the light beam sensible area, a notice relating to the detection of this light beam.

9. An apparatus according to claim 8, further comprising
an integration unit which amplifies and integrates an output signal from the beam passage position detection unit;
a first timing generating unit which provides a first integration operation time period to the integration unit at a time of a beam passage position control by using two photodetector elements disposed at a position equivalent to a position of the to-be-scanned surface with a first interval provided between the photodetector elements in the main scan direction;
a second timing generating unit which provides a second integration operation time period different from the first integration operation time period to the integration unit at a time of offset detection which is different from the time of the beam passage position control by using two photodetector elements disposed at a position equivalent to the position of the to-be-scanned surface with a second interval provided between the photodetector elements in the main scan direction;
an offset detection unit which operates the integration unit and detects an electrical offset value of the integration unit at the second integration operation time period provided by the second timing generating unit;
a first correction unit which corrects the offset value detected by the offset detection unit on the basis of a ratio of the first and second intervals; and
a second correction unit which corrects an integration result of the integration unit at the time of the beam passage position control on the basis of the offset value corrected by the first correction unit.

10. An apparatus according to claim 1, further comprising:
a beam monitoring unit which is disposed at a position equivalent to the position of the to-be-scanned surface, and detects the fixed light beam passing over an area outside a light beam sensible area of the beam passage position detection unit; and
a notice unit which issues, when the beam monitoring unit has detected the fixed light beam passing over the area outside the light beam sensible area, a notice relating to the detection of this fixed light beam.

11. An apparatus according to claim 1, further comprising:
an integration unit which amplifies and integrates an output signal from the beam passage position detection unit;
a first timing generating unit which provides a first integration operation time period to the integration unit at a time of a beam passage position control by using two photodetector elements disposed at a position equivalent to a position of the to-be-scanned surface with a first interval provided between the photodetector elements in the main scan direction;
a second timing generating unit which provides a second integration operation time period different from the first integration operation time period to the integration unit at a time of offset detection which is different from the time of the beam passage position control by using two photodetector elements disposed at a position equivalent to the position of the to-be-scanned surface with a second interval provided between the photodetector elements in the main scan direction;
an offset detection unit which operates the integration unit and detects an electrical offset value of the integration unit at the second integration operation time period provided by the second timing generating unit;
a first correction unit which corrects the offset value detected by the offset detection unit; and
a second correction unit which corrects an integration result of the integration unit at the time of the beam passage position control on the basis of the offset value corrected by the first correction unit.

12. An apparatus according to claim 11, wherein said first correction unit corrects the offset value on the basis of a ratio of the first and second intervals.

13. An apparatus according to claim 11, wherein said first correction unit corrects the offset value on the basis of a time ratio between the first and second integration operation time periods.

14. An apparatus according to claim 11, further comprising a light amount detection unit which adds outputs of the photodetector elements when the light beam passes over the photodetector element, and provides an added result as a light amount of the light beam.

15. An apparatus according to claim 14, wherein a sum of dimensions of said pair of photodetector elements in the main scan direction is constant at any point in a sub-scan direction perpendicular to the main scan direction.

16. An apparatus according to claim 14, wherein the first and second photodetector elements have the same shape.

17. A light beam scanning apparatus comprising:

a light beam generating unit which outputs a light beam;

a scanner for reflecting the light beam output from the light beam generating unit toward a surface to be scanned, and scanning the light beam over the to-be-scanned surface; and a light amount detection unit which includes first and second photodetector elements disposed at a position equivalent to a position of the to-be-scanned surface with a predetermined interval provided between the first and second photodetector elements in a main scan direction of the light beam scanned by the scanner, the light amount detection unit adding outputs from the first and second photodetector elements while the light beam scans the photodetector elements, and provides an added result as a light amount of the light beam.

18. An apparatus according to claim 17, wherein a sum of dimensions of the first and second photodetector elements in the main scan direction is constant at any point in a sub-scan direction perpendicular to the main scan direction.

19. An apparatus according to claim 17, wherein the first and second photodetector elements have the same shape.

* * * * *